US008891052B2

United States Patent
Sugiyama et al.

(10) Patent No.: US 8,891,052 B2
(45) Date of Patent: Nov. 18, 2014

(54) LIQUID CRYSTAL DISPLAY DEVICE COMPRISING FIRST AND SECOND OPTICAL DEFLECTORS WHEREIN EACH OF THE FIRST AND SECOND OPTICAL DEFLECTORS INCLUDES A PLURALITY OF LIQUID CRYSTAL DEFLECTION ELEMENTS

(75) Inventors: Keiji Sugiyama, Kyoto (JP); Shinichi Shikii, Nara (JP)

(73) Assignee: Panasonic Corporation, Osaka (JP)

( * ) Notice: Subject to any disclaimer, the term of this patent is extended or adjusted under 35 U.S.C. 154(b) by 80 days.

(21) Appl. No.: 13/820,692

(22) PCT Filed: Jul. 13, 2012

(86) PCT No.: PCT/JP2012/004537
§ 371 (c)(1),
(2), (4) Date: Mar. 4, 2013

(87) PCT Pub. No.: WO2013/014875
PCT Pub. Date: Jan. 31, 2013

(65) Prior Publication Data
US 2013/0155337 A1 Jun. 20, 2013

(51) Int. Cl.
| G02F 1/13 | (2006.01) |
| G02F 1/1335 | (2006.01) |
| H04N 13/04 | (2006.01) |
| G02B 27/00 | (2006.01) |
| G02B 27/22 | (2006.01) |
| G02F 1/1347 | (2006.01) |
| G02F 1/29 | (2006.01) |

(52) U.S. Cl.
CPC .......... *G02F 1/1313* (2013.01); *H04N 13/0418* (2013.01); *G02F 1/29* (2013.01); *H04N 13/0472* (2013.01); *G02B 27/0093* (2013.01); *G02F 1/133615* (2013.01); *G02B 27/2242* (2013.01); *H04N 13/0477* (2013.01); *G02B 27/225* (2013.01); *H04N 13/0411* (2013.01); *H04N 13/0475* (2013.01); *G02F 1/1347* (2013.01)

USPC .............................. 349/198; 349/15; 349/202

(58) Field of Classification Search
USPC ............................ 349/15, 193, 198, 201, 202
See application file for complete search history.

(56) References Cited

U.S. PATENT DOCUMENTS 6,169,594 B1    1/2001   Aye et al.
(Continued)

FOREIGN PATENT DOCUMENTS

| DE | 102010043061 | 7/2011 |
| JP | 07-098439 | 4/1995 |
| JP | 08-106278 | 4/1996 |
| JP | 11-234705 | 8/1999 |

(Continued)

OTHER PUBLICATIONS

International Search Report issued Oct. 9, 2012 in corresponding International Application No. PCT/JP2012/004537.

*Primary Examiner* — Paul Lee
(74) *Attorney, Agent, or Firm* — Wenderoth, Lind & Ponack, L.L.P.

(57) ABSTRACT

Included is a light emitting unit, an optical deflector, a control unit, and a liquid crystal panel. The optical deflector includes a first optical deflector and a second optical deflector which are arranged side by side in a direction from a light incident side to a light emitting side. A maximum light deflection angle of the first optical deflector is smaller than a maximum light deflection angle of the second optical deflector, and a maximum light deflection speed of the first optical deflector is higher than a maximum light deflection speed of the second optical deflector. The first optical deflector includes a first optical deflection layer and a second optical deflection layer stacked in the direction from the light incident side to the light emitting side. Each of the first and second optical deflection layers includes the liquid crystal deflection elements arranged in the planar state.

9 Claims, 18 Drawing Sheets

(56) References Cited

U.S. PATENT DOCUMENTS

| | | | |
|---|---|---|---|
| 6,587,180 B2 * | 7/2003 | Wang et al. | 349/202 |
| 7,580,186 B2 | 8/2009 | Mather et al. | |
| 2004/0223113 A1 * | 11/2004 | Blum et al. | 349/200 |
| 2005/0111100 A1 | 5/2005 | Mather et al. | |

FOREIGN PATENT DOCUMENTS

| | | |
|---|---|---|
| JP | 2002-523802 | 7/2002 |
| JP | 2006-184447 | 7/2006 |
| JP | 4367775 | 11/2009 |
| WO | 00/11515 | 3/2000 |

* cited by examiner

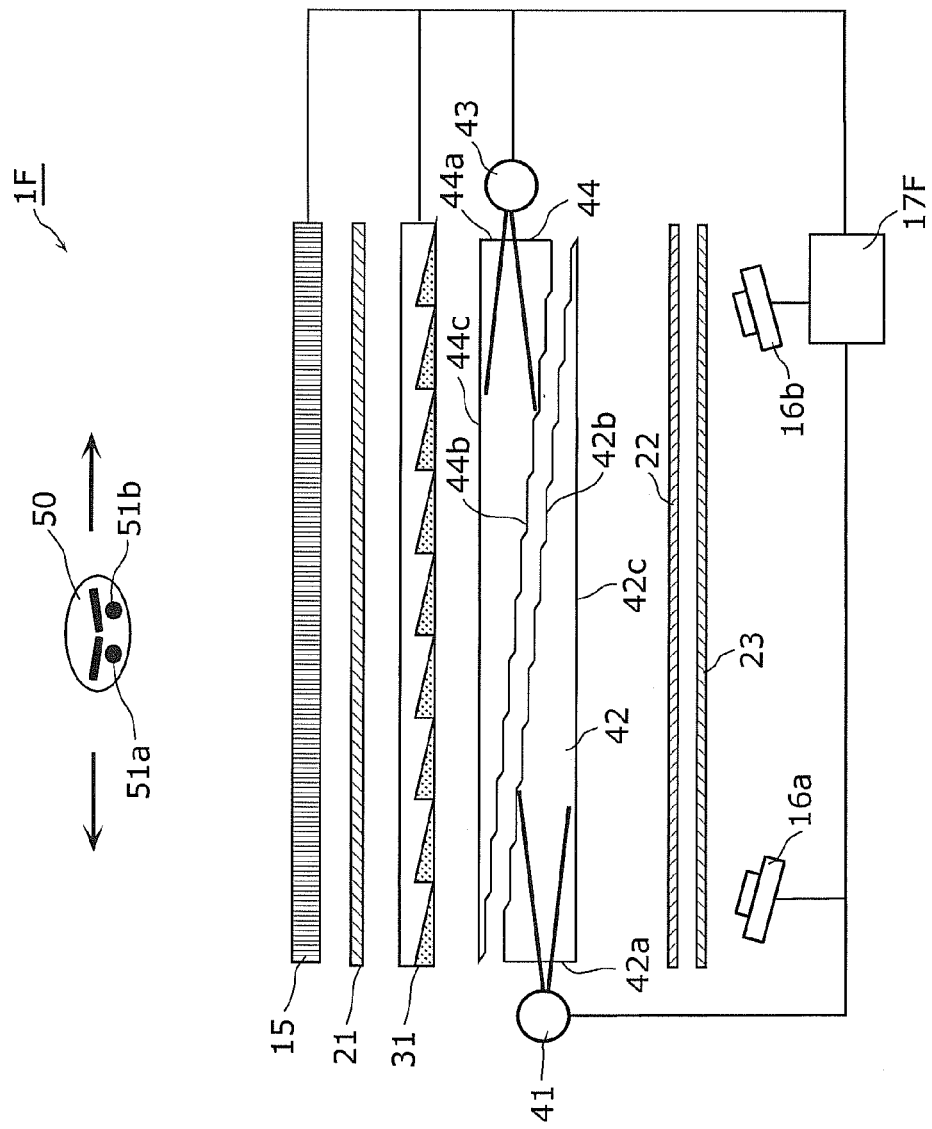

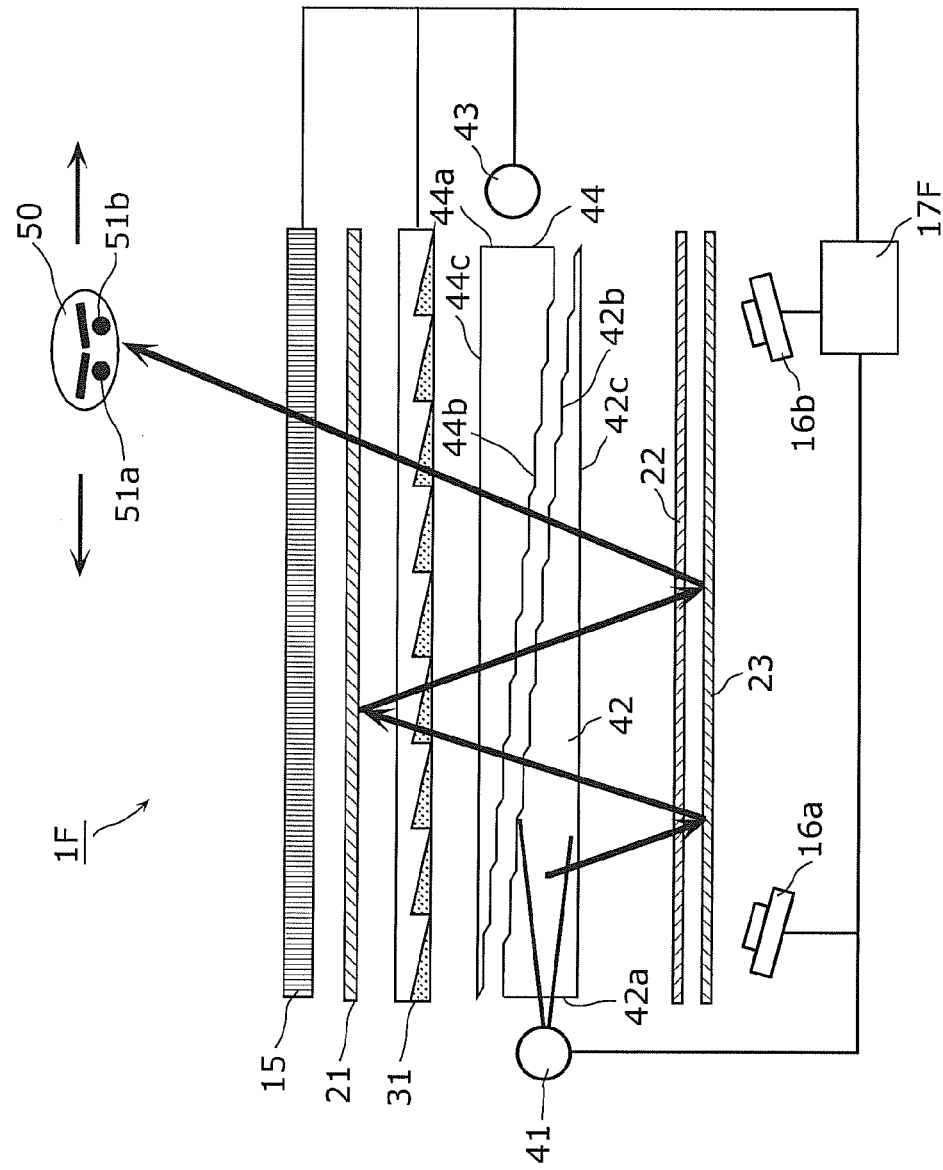

LIQUID CRYSTAL DISPLAY DEVICE COMPRISING FIRST AND SECOND OPTICAL DEFLECTORS WHEREIN EACH OF THE FIRST AND SECOND OPTICAL DEFLECTORS INCLUDES A PLURALITY OF LIQUID CRYSTAL DEFLECTION ELEMENTS

This application is the National Stage of International Application No. PCT/JP2012/004537, filed Jul. 13, 2012, which claims the benefit of U.S. Provisional Application No. 61/510,541, filed Jul. 22, 2011.

TECHNICAL FIELD

The present disclosure relates to liquid crystal display devices using optical deflectors capable of flexibly deflecting light.

BACKGROUND ARTS

Various optical deflectors which deflect incident light have conventionally been studied. Optical deflectors are devices indispensable to, for example, laser scanners used in laser printers or the like. Examples of conventional optical deflectors include polygon scanners, galvanometer scanners, and Micro Electro Mechanical System (MEMS) mirrors. However, since such polygon scanners, galvanometer scanners, MEMS mirrors, or the like include a mobile unit (mechanical mechanism) for moving parts, there is a problem in that a failure easily occurs. For this reason, there is demand for the development of optical deflectors capable of deflecting light without including a mobile unit.

In response to that demand, an optical deflector as disclosed in Patent Literature (PTL) 1 below has been proposed. This optical deflector does not include a mobile unit, and deflects light with use of the fact that the refractive indexes of liquid crystals are modulated by application of voltage. Through this, it is possible to reduce the occurrence of failures and achieve high reliability.

Furthermore, PTL 2 below discloses a liquid crystal display device capable of displaying three dimensional (3D) images using the above optical deflector. This liquid crystal display device deflects, at a predetermined timing, light incident on the optical deflector to be collected on a viewer's right eye viewing a liquid crystal panel. In synchronization with the timing, a right-eye image is displayed on the liquid crystal panel. After the predetermined timing, the light incident on the optical deflector is deflected to be collected on a viewer's left eye. In synchronization with the timing, a left-eye image is displayed on the liquid crystal panel. By alternately switching between a right-eye image and a left-eye image to be displayed on the liquid crystal panel at a predetermined cycle (for example, 8.3 msec: 120 Hz), the viewer perceives the images displayed on the liquid crystal panel as 3D images.

CITATION LIST

Patent Literature

[PTL1] Japanese Unexamined Patent Application Publication (Translation of International PCT Application) No. 2002-523802
[PTL2] Japanese Unexamined Patent Application Publication No. 7-98439
[PTL3] Japanese Patent No. 4367775

SUMMARY OF INVENTION

Technical Problem

In the above-described conventional liquid crystal display devices, if a height of a liquid crystal having the optical deflector (in other words, a height in a direction from a light incident side to a light emitting side) is set to relatively great in order to increase a light deflection angle of an optical deflector, a light deflection speed of the optical deflector is decreased. The decrease of the light deflection speed of the optical deflector fails switching between a right-eye image and a left-eye image to be displayed at a high speed. As a result, there is a problem of deteriorating image quality of images displayed on the liquid crystal panel.

In order to solve the above-described problems of the conventional arts, an object of the present disclosure is to provide a liquid crystal display device capable of increasing a light deflection angle, suppressing deterioration of image quality of images displayed on a liquid crystal panel.

Solution to Problem

In accordance with an aspect of the present disclosure for achieving the object, there is provided a liquid crystal display device, comprising: a light emitting unit configured to emit light; an optical deflector that deflects the light emitted by the light emitting unit; a control unit configured to control a light deflection angle of the optical deflector; and a liquid crystal panel that forms an image from the light traveling from the optical deflector, wherein the optical deflector includes a first optical deflector and a second optical deflector which are arranged side by side in a direction from a light incident side to a light emitting side, a maximum light deflection angle of the first optical deflector is smaller than a maximum light deflection angle of the second optical deflector, and a maximum light deflection speed of the first optical deflector is higher than a maximum light deflection speed of the second optical deflector, each of the first optical deflector and the second optical deflector includes a plurality of liquid crystal deflection elements arranged in a planar state, the control unit is configured to apply a voltage to each of the liquid crystal deflection elements to control a refractive index of the each of the liquid crystal deflection elements, thereby controlling a light deflection angle of the first optical deflector and a light deflection angle of the second optical deflector, and the first optical deflector includes a plurality of optical deflection layers stacked in the direction from the light incident side to the light emitting side, each of the optical deflection layers including the liquid crystal deflection elements arranged in the planar state.

It should be noted that the above-described general or specific aspect can be implemented also as a system, a method, an integrated circuit, a computer program, or a computer-readable recording medium such as a Compact Disc-Read Only Memory (CD-ROM), or as a desired combination of them.

Advantageous Effects of Invention

The liquid crystal display device according to the present disclosure is capable of increasing a light deflection angle, suppressing deterioration of image quality of images displayed on a liquid crystal panel.

BRIEF DESCRIPTION OF DRAWINGS

FIG. 10 is a cross-sectional view of a liquid crystal display device according to Embodiment 7.

FIG. 12A is a cross-sectional view of a liquid crystal display device in a first lighting state.

DESCRIPTION OF EMBODIMENTS

Background to Embodiments of the Present Disclosure

The liquid crystal display devices disclosed in "Background Arts", however, develop the following problems.

Figure 14A:
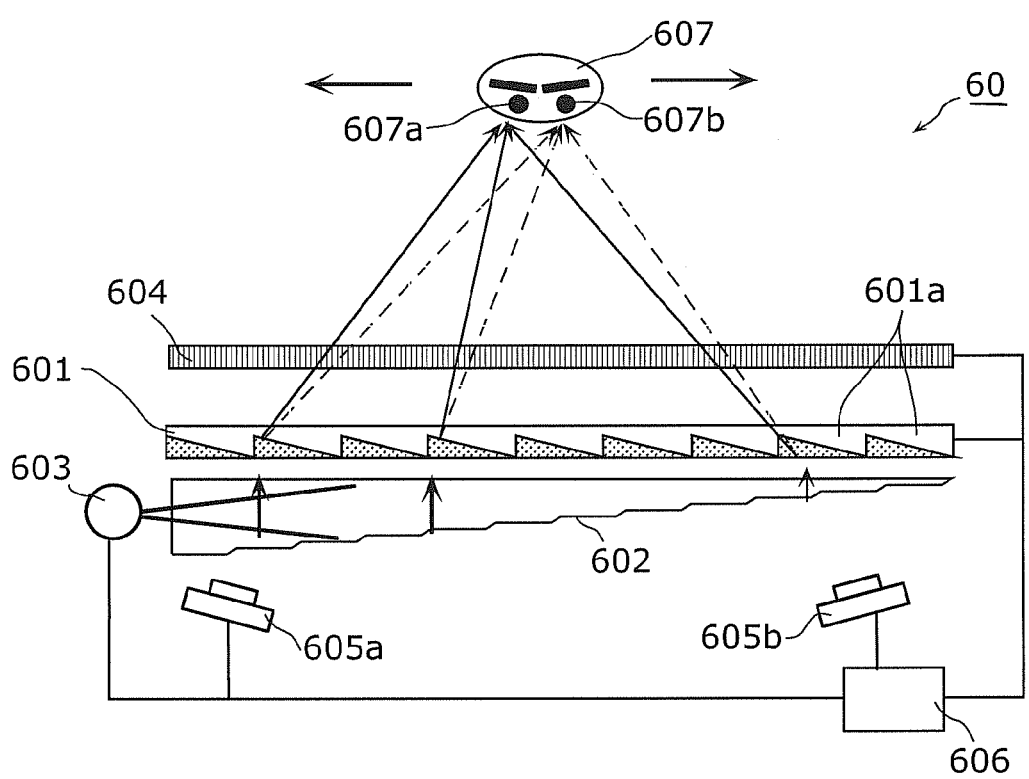
FIG. 14A is a cross-sectional view of a liquid crystal display device according to a conventional art.

FIG. 14A is a cross-sectional view of a liquid crystal display device according to a conventional art. In FIG. 14A, a liquid crystal display device 60 includes an optical deflector 601, a light guide plate 602, a light source 603, a liquid crystal panel 604, a pair of stereo cameras 605a and 605b, and a control unit 606. The optical deflector 601 includes a plurality of liquid crystal deflection elements 601a, which will be described later, in a lateral direction. Each of the optical deflector 601, the light source 603, the liquid crystal panel 604, and the pair of the stereo cameras 605a and 605b is controlled by the control unit 606.

Figure 14B:
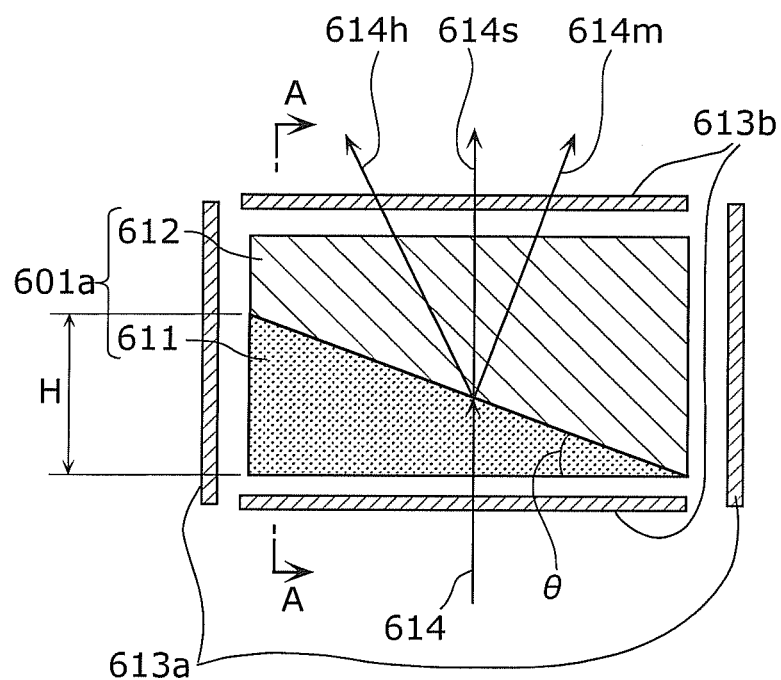
FIG. 14B is a cross-sectional view of a liquid crystal deflection element shown in FIG. 14A.
Figure 14C:
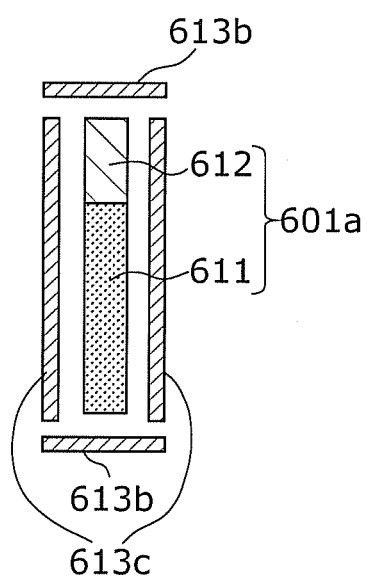
FIG. 14C is a cross-sectional view of the liquid crystal deflection element taken along line A-A of FIG. 14B.

FIG. 14B is a cross-sectional view of one of the liquid crystal deflection elements shown in FIG. 14A. FIG. 14C is a cross-sectional view of the liquid crystal deflection element taken along line A-A of FIG. 14B. In these figures, the liquid crystal deflection element 601a includes a liquid crystal 611 having a triangular shape in cross section and a dielectric 612 having a shape complementary to that of the liquid crystal 611. The dielectric 612 is provided on the inclined surface side of the liquid crystal 611, as a result of which the liquid crystal deflection element 601a as a whole is configured in a rectangular shape in cross section. The dielectric 612 is made of, for example, a polymeric resin such as a plastic, or glass. Furthermore, a pair of electrodes 613a, a pair of electrodes 613b, and a pair of electrodes 613c are provided around each of the liquid crystal deflection elements 601a. The two electrodes in each of the electrode pairs 613a, 613b, and 613c face each other with the liquid crystal deflection element 601a therebetween.

As shown by an arrow 614 in FIG. 14B, light is incident on the liquid crystal deflection element 601a. When a voltage (including a zero voltage) is applied to each of the electrode pairs 613a, 613b, and 613c, the refractive index of the liquid crystal 611 is modulated and the light incident on the liquid crystal 611 is thereby deflected. More specifically, when a refractive index NL of the liquid crystal 611 is higher than a refractive index ND of the dielectric 612, light is refracted at the interface between the liquid crystal 611 and the dielectric 612 in a direction shown by an arrow 614h in FIG. 14B. When the refractive index NL of the liquid crystal 611 is lower than the refractive index ND of the dielectric 612, light is refracted at the interface between the liquid crystal 611 and the dielectric 612 in a direction shown by an arrow 614m in FIG. 14B. The resulting deflected light is provided from the liquid crystal deflection element 601a. When the refractive index NL of the liquid crystal 611 and the refractive index ND of the dielectric 612 are the same value, light travels in a straight direction shown by an arrow 614s in FIG. 14B without being refracted at the interface between the liquid crystal 611 and the dielectric 612.

Next, a description is given for a mechanism of operations performed by the liquid crystal display device 60 with reference to FIG. 14A. Light emitted from the light source 603 is incident on the one lateral surface of the light guide plate 602, propagates through the light guide plate 602, is bent substantially perpendicular by a prism formed on the bottom surface of the light guide plate 602, and then travels from the top surface of the light guide plate 602. The light, which is incident substantially perpendicular to the optical deflector 601, is deflected by the optical deflector 601 at a predetermined timing, thereby being collected onto a right eye 607a of a viewer 607. In synchronization with the predetermined timing, the liquid crystal panel 604 displays a right-eye image. After the above predetermined timing, light, which is incident substantially perpendicular to the optical deflector 601, is deflected by the optical deflector 601 to be collected onto a left eye 607b of the viewer 607. In synchronization with the predetermined timing, the liquid crystal panel 604 displays a left-eye image. By alternately switching between a right-eye image and a left-eye image to be displayed on the liquid crystal panel 604 at a predetermined cycle (for example, 8.3 msec: 120 Hz), the viewer 607 perceives the images displayed on the liquid crystal panel 604 as 3D images.

In a case where the position of the head of the viewer 607 shifts from the predetermined position, it is necessary to adjust the light emitted from the liquid crystal panel 604 according to the move of the head of the viewer 607. Based on the positions of the right eye 607a and the left eye 607b of the viewer 607 which are detected by the pair of the stereo cameras 605a and 605b, the control unit 606 controls light deflection angle of the optical deflector 601.

The conventional liquid crystal display device 60 has a problem that a light deflection angle of the optical deflector 601 is increased to adjust the light emitted from the liquid crystal panel 604 according to the move of the head of the viewer 607. In general, the light deflection angle of the optical deflector 601 is increased by setting a height H of the liquid crystal 611 having the optical deflector 601a (in other words, the height in a direction from a light incident side to a light emitting side) to be relatively large, thereby setting an inclination angle θ of the inclined surface of the liquid crystal 611 to be relatively large.

However, as the height H of the liquid crystal 611 is greater, a speed for modulating a refractive index of the liquid crystal 611 is decreased. As a result, a light deflection speed of the optical deflector 601 is decreased. Displaying high-quality 3D images on the liquid crystal panel 604 requires high-speed switching between a right-eye image and a left-eye image to be displayed. If the light deflection speed of the optical deflector 601 is decreased, it is impossible to switch between a right-eye image and a left-eye image at a high speed. As a result, there is a problem of deteriorating image quality of images displayed on the liquid crystal panel 604.

The above PTL 3 discloses a method of increasing a light deflection angle by using a lens array. This method can increase a deflection angle of light travels from an optical deflector, by providing a two-layered lens array between an optical deflector and a liquid crystal panel. In such a method, however, aberration and the like caused by the lens array would decrease image quality of images displayed on the liquid crystal panel. For example, if the deflection angle of the light travelling from the optical deflector is increased five times by the lens array, a diameter of light travelling from the lens array is decreased to one fifth of a diameter of light incident on the lens array. As a result, an area of the liquid crystal panel on which light travelling from the lens array is incident is reduced, which would result in moire, pixel missing, and the like on the liquid crystal panel.

In accordance with an aspect of the present disclosure for achieving the object, there is provided a liquid crystal display device, comprising: a light emitting unit configured to emit light; an optical deflector that deflects the light emitted by the light emitting unit; a control unit configured to control a light deflection angle of the optical deflector; and a liquid crystal panel that forms an image from the light traveling from the optical deflector, wherein the optical deflector includes a first optical deflector and a second optical deflector which are arranged side by side in a direction from a light incident side to a light emitting side, a maximum light deflection angle of the first optical deflector is smaller than a maximum light deflection angle of the second optical deflector, and a maximum light deflection speed of the first optical deflector is higher than a maximum light deflection speed of the second optical deflector, each of the first optical deflector and the second optical deflector includes a plurality of liquid crystal deflection elements arranged in a planar state, the control unit is configured to apply a voltage to each of the liquid crystal deflection elements to control a refractive index of the each of the liquid crystal deflection elements, thereby controlling a light deflection angle of the first optical deflector and a light deflection angle of the second optical deflector, and the first optical deflector includes a plurality of optical deflection layers stacked in the direction from the light incident side to the light emitting side, each of the optical deflection layers including the liquid crystal deflection elements arranged in the planar state.

With this structure, the first optical deflector can deflect light at a relatively high deflection speed, and the second optical deflector can deflect light at a relatively large deflection angle. As a result, it is possible to increase a light deflection angle, suppressing deterioration of image quality of images displayed on the liquid crystal panel. In addition, the first optical deflector having a plurality of sequentially stacked optical deflection layers can further increase the light deflection angle of the first optical deflector.

For example, it is also possible that the optical deflection layers include at least a first optical deflection layer and a second optical deflection layer, and the control unit is configured to: when a light deflection direction of the first optical deflector is to be controlled to be a first deflection direction, control respective refractive indexes of the liquid crystal deflection elements in the first optical deflection layer to prevent the first optical deflection layer from deflecting the light, and when the light deflection direction of the first optical deflector is to be controlled to be a second deflection direction different from the first deflection direction, control respective refractive indexes of the liquid crystal deflection elements in the second optical deflection layer to prevent the second optical deflection layer from deflecting the light.

This structure can prevent that the light passing the first optical deflection layer spreads due to diffraction. As a result, occurrence of crosstalk can be suppressed.

For example, it is further possible that the control unit has a visual distance measurement unit configured to measure a visual distance between a viewer viewing the liquid crystal panel and the liquid crystal panel, and the control unit is configured to control an angle of a range in which the first optical deflector deflects the light to be equal to or larger than a larger one of a both-eye angle and a half angle, the both-eye angle being determined by a distance between both eyes of the viewer and the visual distance measured by the visual distance measurement unit, the half angle being a spread angle of light which is emitted from the liquid crystal panel and spreads due to diffraction until the light is incident on an eye of the viewer.

This structure can suppress occurrence of crosstalk, even if a visual distance between the viewer and the liquid crystal panel is changed.

For example, it is still further possible that the control unit is configured to change light deflection angles of at least two of the optical deflection layers, every time the first optical deflector deflects the light to a specific deflection direction.

This structure can change a path of the light passing through the first optical deflector, every time the first optical deflector deflects the light in a predetermined deflection direction. As a result, even if a laser source is used as a light source, it is possible to suppress occurrence of speckle.

For example, it is still further possible that the liquid crystal deflection elements includes respective liquid crystals, and each of respective heights of the liquid crystals in the first optical deflector in the direction from the light incident side to the light emitting side is lower than a height of a corresponding one of the liquid crystals in the second optical deflector in the direction from the light incident side to the light emitting side.

This structure can set a light deflection speed of the first optical deflector higher than a light deflection speed of the second optical deflector.

For example, it is still further possible that the liquid crystal deflection elements includes respective liquid crystals, each of respective widths of the liquid crystals in the first optical deflector in a direction perpendicular to the direction from the light incident side to the light emitting side is smaller than a width of a corresponding one of the liquid crystals in the second optical deflector in the direction perpendicular to the direction from the light incident side to the light emitting side.

This structure can set a light deflection angle of the second optical deflector larger than a light deflection angle of the first optical deflector.

For example, it is still further possible that the liquid crystal deflection elements include respective liquid crystals, and each of respective change widths of refractive indexes of the liquid crystals in the first optical deflector is smaller than a change width of a refractive index of a corresponding one of the liquid crystals in the second optical deflector.

This structure can set a light deflection speed of the first optical deflector higher than a light deflection speed of the second optical deflector.

For example, it is still further possible that the liquid crystal display device further includes a head position detection unit configured to detect a position of a head of a viewer viewing the liquid crystal panel, and wherein the control unit is configured to control a light deflection angle of the second optical deflector based on the position of the head of the viewer which is detected by the head position detection unit.

With this structure, the light deflection angle of the second optical deflector is controlled based on the position of the viewer's head. As a result, it is possible to adjust the light emitted from the liquid crystal panel according to move of the viewer's head.

For example, it is still further possible that the liquid crystal display device further includes a both-eye position detection unit configured to detect positions of both eyes of a viewer viewing the liquid crystal panel, wherein the control unit is configured to control a light deflection angle of the first optical deflector based on the positions of the both eyes of the viewer which are detected by the both-eye position detection unit.

With this structure, the light deflection angle of the first optical deflector is controlled based on the position of the viewer's eyes. As a result, it is possible to collect the light emitted from the liquid crystal panel onto the viewer's eyes.

It should be noted that the above-described general or specific aspect can be implemented also as a system, a method, an integrated circuit, a computer program, or a computer-readable recording medium such as a Compact Disc-Read Only Memory (CD-ROM), or as a desired combination of them.

EMBODIMENTS

The following describes embodiments according to the present disclosure with reference to the drawings. It should be noted that all the embodiments described below are specific examples of the present disclosure. Numerical values, shapes, materials, constituent elements, arrangement positions and the connection configuration of the constituent elements, steps, the order of the steps, and the like described in the following embodiments are merely examples, and are not intended to limit the present disclosure. Therefore, among the constituent elements in the following embodiments, constituent elements that are not described in independent claims that show the most generic concept of the present disclosure are described as elements constituting more desirable configurations.

(Embodiment 1)

Figure 1A:
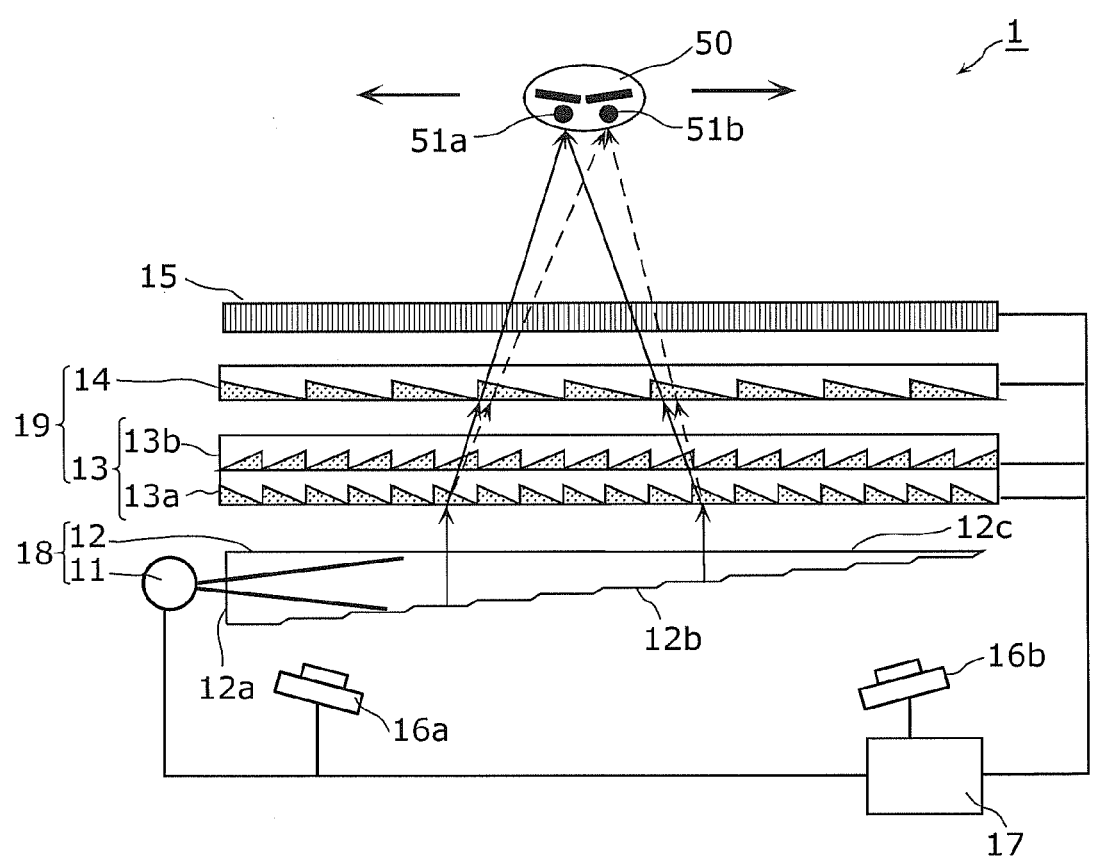
FIG. 1A is a cross-sectional view of a liquid crystal display device according to Embodiment 1.
Figure 1B:
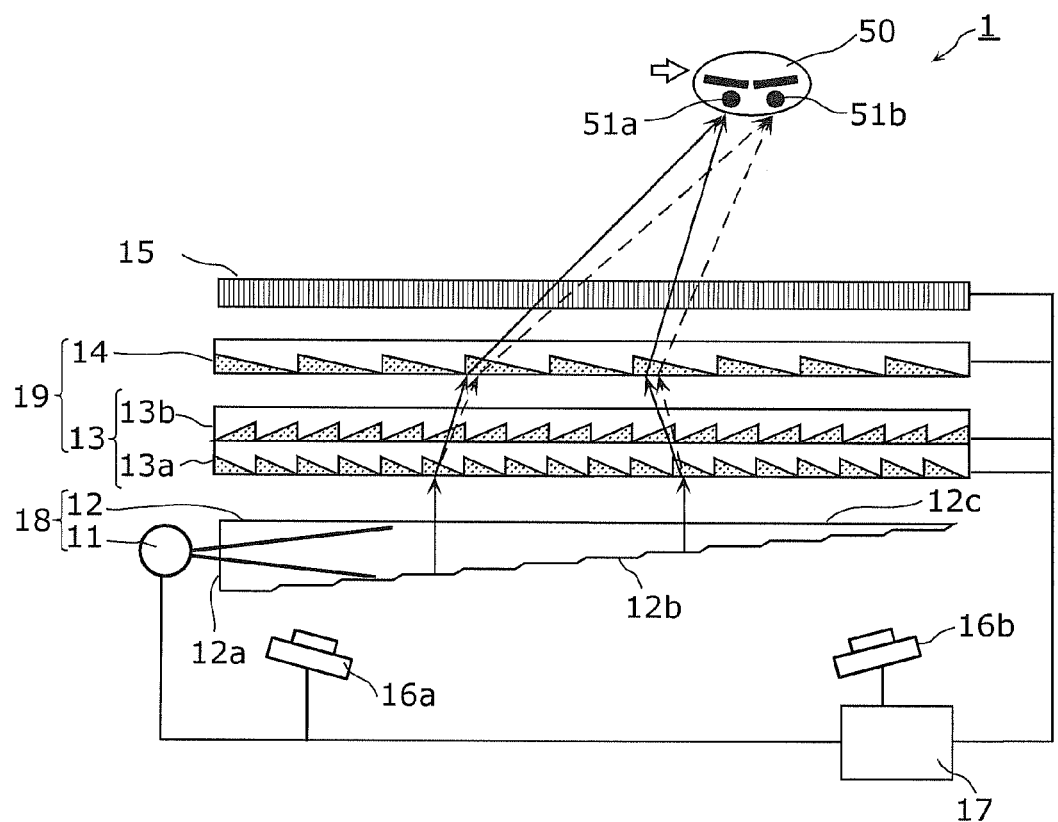
FIG. 1B is a cross-sectional view of the liquid crystal display device according to Embodiment 1.

Each of FIGS. 1A and 1B is a cross-sectional view of a liquid crystal display device 1 according to Embodiment 1. The liquid crystal display device 1 in these figures includes a light source 11, a light guide plate 12, a first optical deflector 13, a second optical deflector 14, a liquid crystal panel 15, a pair of stereo cameras 16a and 16b (which are a head position detection unit and a both-eye position detection unit), and a control unit 17. The liquid crystal display device 1 according to the present embodiment is, for example, a tablet 3D display device which allows a viewer to view 3D images with naked eyes without wearing dedicated glasses The light source 11 includes, for example, a plurality of Light Emitting Diodes (LED) arranged one by one in a direction perpendicular to the sheet of FIG. 1A. The light source 11 emits light towards one lateral surface 12a of the light guide plate 12.

The light guide plate 12 has a bottom surface having an uneven prism 12b. The light guide plate 12 has a top surface that is a principal surface 12c extending in a direction substantially perpendicular to the lateral surface 12a of the light guide plate 12. The light source 11 and the light guide plate 12 form a light emitting unit 18.

The first optical deflector 13 and the second optical deflector 14 are arranged side by side in a direction from a light incident side to a light emitting side (in other words, an up-down direction in FIG. 1A). The light incident side is the lower side of FIG. 1A, and the light emitting side is the upper side of FIG. 1A. The first optical deflector 13 faces the principal surface 12c of the light guide plate 12. The second optical deflector 14 faces the light emitting side of the first optical deflector 13. The first optical deflector 13 and the second optical deflector 14 form an optical deflector 19. Structures of the respective first optical deflector 13 and second optical deflector 14 will be described later.

The liquid crystal panel 15 faces the light emitting side of the second optical deflector 14. On a display region of the liquid crystal panel 15, a plurality of pixels are arranged in a matrix.

Regarding the pair of the stereo cameras 16a and 16b, the stereo camera 16 captures an image of a right eye 51a of a viewer 50 viewing the liquid crystal panel 15, and the stereo camera 16b captures an image of a left eye 51b of the viewer 50. The pair of the stereo cameras 16a and 16b therefore detects a position of the head of the viewer 50 and positions of the right eye 51a and the left eye 51b of the viewer 50.

The control unit 17 controls a light deflection angle of the first optical deflector 13 and a light deflection angle of the second optical deflector 14, based on the image signals provided from the pair of the stereo cameras 16a and 16b. Furthermore, the control unit 17 controls images displayed on the liquid crystal panel 15 and also controls a lighting state of the light source 11.

Next, structures of the respective first optical deflector 13 and second optical deflector 14 are described. Each of FIGS. 2A and 2B shows an enlarged cross-sectional view of a part of the first optical deflector 13 and a part of the second optical deflector 14.

Figure 2A:
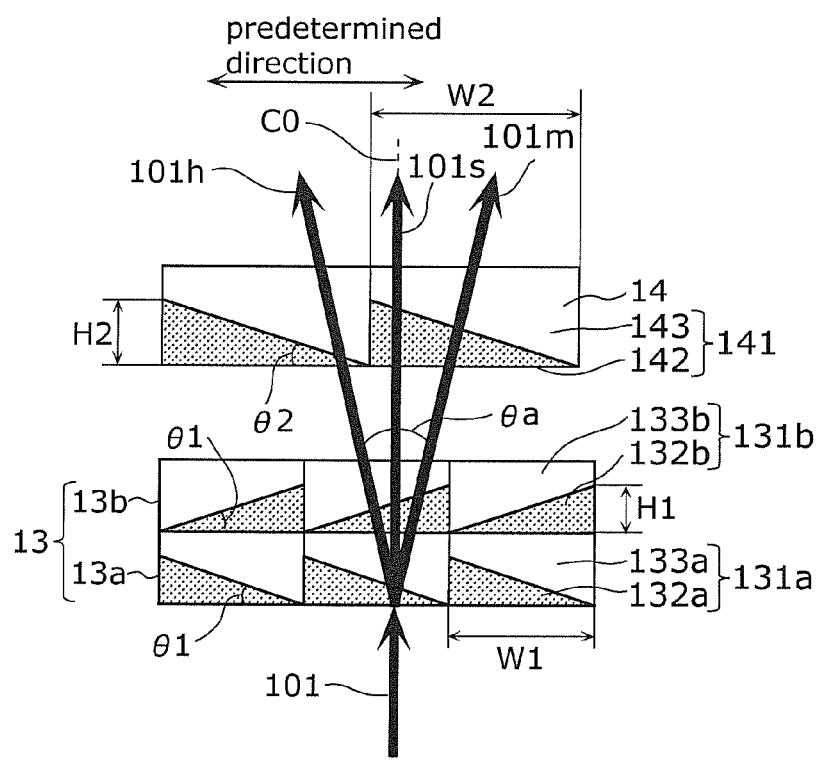
FIG. 2A is an enlarged cross-sectional view of a part of a first optical deflector and a part of a second optical deflector.
Figure 2B:
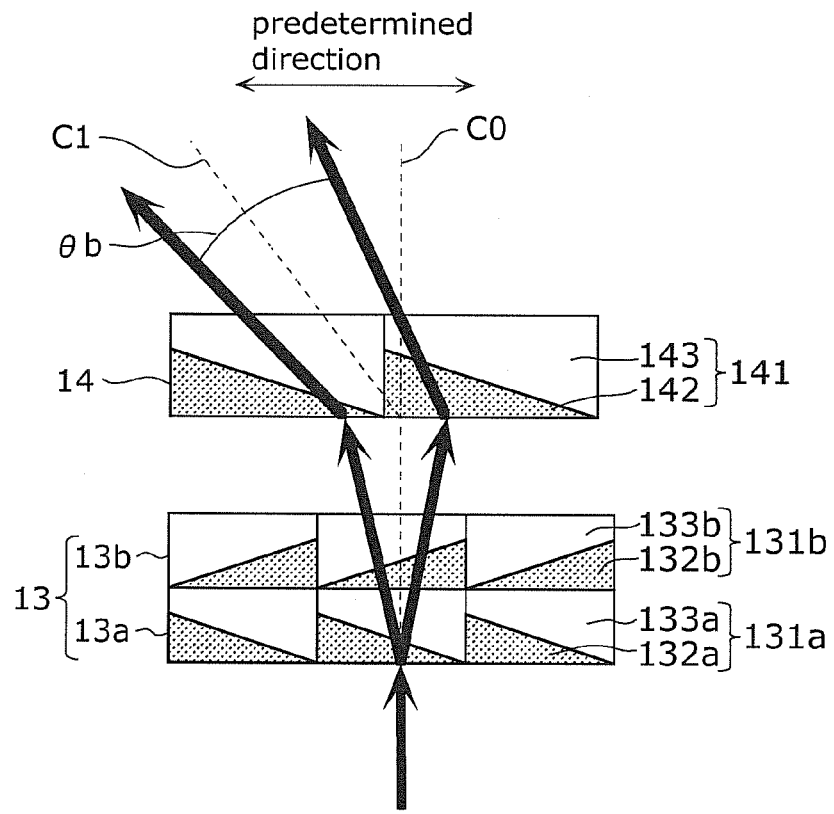
FIG. 2B is an enlarged cross-sectional view of a part of the first optical deflector and a part of the second optical deflector.

As shown in FIG. 2A, the first optical deflector 13 includes a first optical deflection layer 13a and a second optical deflection layer 13b which are stacked in a direction from the light incident side to the light emitting side. Therefore, the first optical deflection layer 13a is located closer to the light guide plate 12, and the second optical deflection layer 13b is located closer to the second optical deflector 14.

The first optical deflection layer 13a includes a plurality of liquid crystal deflection elements 131a in a planar state. Each of the liquid crystal deflection elements 131a include a liquid crystal 132a having a triangular shape in cross section and a dielectric 133a having a shape complementary to that of the liquid crystal 132a. The dielectric 133a is made of, for example, a polymeric resin such as a plastic, or glass. The dielectric 133a is provided on the inclined surface side of the liquid crystal 132a. With the structure, each of the liquid crystal deflection elements 131a has a rectangular shape in cross section as a whole.

Around each of the liquid crystal deflection elements 131a, a pair of electrodes (not shown) is provided for applying a voltage to the liquid crystal 132a. The pair of electrodes is provided such that the two electrodes face each other with the corresponding liquid crystal deflection element 131a therebetween. When the control unit 17 controls the voltage applied between the pair of electrodes, a refractive index NL of the liquid crystal 132a can be modulated at a predetermined modulation range. For example, when a first voltage is applied between the pair of electrodes, the refractive index NL of the liquid crystal 132a is higher than the refractive index ND of the dielectric 133a. When a second voltage different from the first voltage is applied between the pair of electrodes, the refractive index NL of the liquid crystal 132a is lower than the refractive index ND of the dielectric 133a. When a third voltage, which is different from the first voltage and the second voltage, is applied between the pair of electrodes, the refractive index NL of the liquid crystal 132a is the same value as the refractive index ND of the dielectric 133a. In such a manner, the internal refractive index distribution of the liquid crystal deflection element 131a is modulated. It should be noted that each of the first voltage, the second voltage, and the third voltage has a certain level of voltage, but may be a zero voltage.

When the third voltage is applied between the pair of electrodes, the refractive index NL of the liquid crystal 132a is the same value as the refractive index ND of the dielectric 133a. Light, which is incident on the liquid crystal 132a as shown by an arrow 101 in FIG. 2A, travels in a straight direction shown by an arrow 101s in FIG. 2A without being refracted at the interface between the liquid crystal 132a and the dielectric 133a. When the first voltage is applied between the pair of electrodes, the refractive index NL of the liquid crystal 132a is higher than the refractive index ND of the dielectric 133a. As a result, the light is refracted at the interface between the liquid crystal 132a and the dielectric 133a, as shown by an arrow 101h in FIG. 2A. When the second voltage is applied between the pair of electrodes, the refractive index NL of the liquid crystal 132a is lower than the refractive index ND of the dielectric 133a. As a result, the light is refracted at the interface between the liquid crystal 132a and the dielectric 133a, as shown by an arrow 101m in FIG. 2A.

Like the first optical deflection layer 13a, the second optical deflection layer 13b also includes a plurality of liquid crystal deflection elements 131b arranged in a planar state. Each of the liquid crystal deflection elements 131b includes a liquid crystal 132b and a dielectric 133b, in the same manner as the liquid crystal deflection element 131a in the first optical deflection layer 13a. Around each of the liquid crystal deflection elements 131b, a pair of electrodes (not shown) is provided for applying a voltage to the liquid crystal 132b.

When the control unit 17 controls the voltage applied between the pair of electrodes, a distribution of refractive indexes in the liquid crystal deflection element 131b is modulated in the same manner as described earlier. According to the present embodiment, a inclination direction of the inclined surface of the liquid crystal 132b in the second optical deflection layer 13b is opposite to the inclination direction of the inclined surface of the liquid crystal 132a in the first optical deflection layer 13a. However, it is also possible that they are the same direction.

In the first optical deflector 13, incident light is two-dimensionally deflected in a predetermined direction (left-to-right direction in FIGS. 1A and 2A) at each part of a plane of the first optical deflector 13. It is thereby possible to collect the light travelling from the first optical deflector 13 onto a predetermined collection point in a three-dimensional space.

Like the first optical deflector 13, the second optical deflector 14 also includes a plurality of liquid crystal deflection elements 141 arranged in a planar state. Each of the liquid crystal deflection elements 141 includes a liquid crystal 142 and a dielectric 143, in the same manner as the liquid crystal deflection element 131a in the first optical deflection layer 13a. Around each of the liquid crystal deflection elements 141, a pair of electrodes (not shown) is provided for applying a voltage to the liquid crystal 142. When the control unit 17 controls the voltage applied between the pair of electrodes, a distribution of refractive indexes in the liquid crystal deflection element 141 is modulated in the same manner as described earlier.

In the second optical deflector 14, incident light is two-dimensionally deflected in the predetermined direction at each part of a plane of the second optical deflector 14. It is thereby possible to collect the light traveling from the second optical deflector 14 onto a predetermined collection point in a three-dimensional space.

According to the present embodiment, each of respective heights H1 of the liquid crystals 132a and 132b in the first optical deflector 13 (in other words, a height in a direction from a light incident side to a light emitting side) is designed to be lower than a height H2 of a corresponding liquid crystal 142 in the second optical deflector 14. As described above, as a height of a liquid crystal is lower, a refractive index of the liquid crystal can be modulated at a higher speed. Therefore, a maximum light deflection speed of the first optical deflector 13 is higher than a maximum light deflection speed of the second optical deflector 14. Here, the deflection speed refers to a ratio of a temporal change in a light deflection angle.

Moreover, each of respective inclination angles θ2 of the inclined surfaces of the liquid crystals 142 in the second optical deflector 14 is designed to be larger than an inclination angle θ1 of an inclined surface of corresponding liquid crystals 132a and 132b in the first optical deflector 13. As described above, as an inclination angle of an inclined surface of a liquid crystal is larger, a light deflection angle can be increased. Therefore, a maximum light deflection angle of the second optical deflector 14 is larger than a maximum light deflection angle of the first optical deflector 13. Here, the deflection angle refers to an angle of a light traveling direction relative to a perpendicular direction (in other words, a direction from a light incident side to a light emitting side). For example, light traveling in the perpendicular direction has a deflection angle of 0 degree.

Each of respective widths W1 of the liquid crystals 132a and 132b in the first optical deflector 13 (in other words, a width in a direction perpendicular to the direction from the light incident side to the light emitting side) is designed to be smaller than a width W2 of a corresponding liquid crystal 142 in the second optical deflector 14.

According to the present embodiment, both the first optical deflector 13 and the second optical deflector 14 are used to two-dimensionally deflect light in the above-described predetermined direction. Functions of the first optical deflector 13 and the second optical deflector 14 are described with reference to FIGS. 3A and 3B.

Figure 3A:
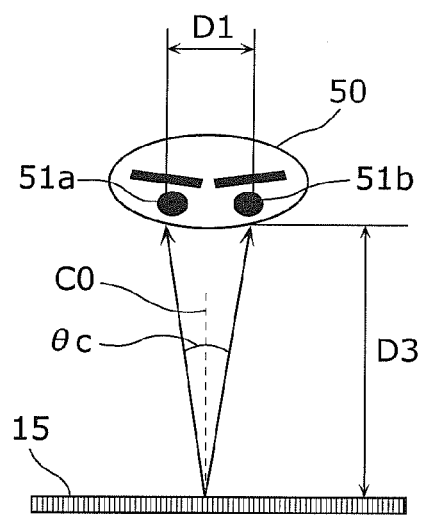
FIG. 3A is a diagram for explaining a light deflection state when a viewer's head is fixed on a predetermined position.
Figure 3B:
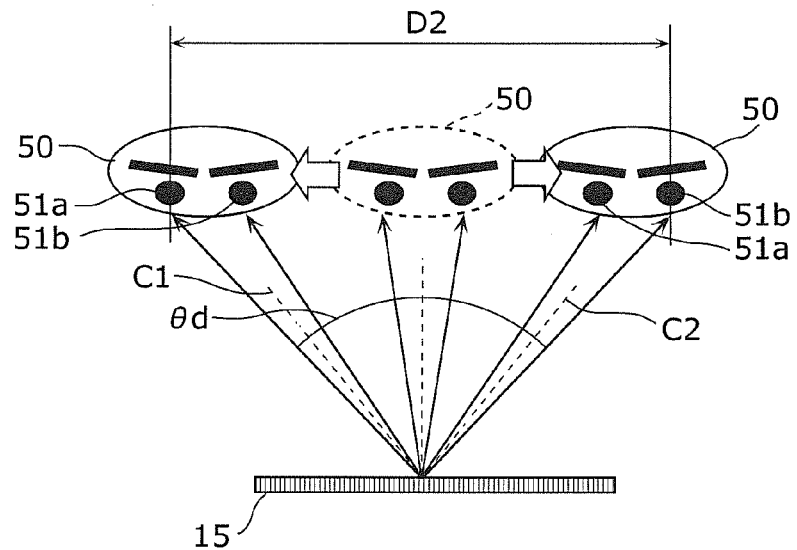
FIG. 3B is a diagram for explaining a light deflection state when the viewer's head moves from the predetermined position.

FIG. 3A is a diagram for explaining a light deflection state when the head of the viewer 50 is fixed on a predetermined position. FIG. 3B is a diagram for explaining a light deflection state when the head of the viewer 50 moves from the predetermined position. As shown in FIG. 3A, in the situation where the head of the viewer 50 is fixed on the predetermined position, when light is emitted from a pixel on the liquid crystal panel 15 (a pixel at the center of the liquid crystal panel 15 in the example of FIG. 3A) and deflected towards the right eye 51a and the left eye 51b of the viewer 50, an angle of the light deflected range is θc. In short, the light emitted from the liquid crystal panel 15 is deflected within a range having the angle θc with respect to the deflection center C0. On the other hand, as shown in FIG. 3B, in the situation where the head of the viewer 50 moves from the predetermined position, when light emitted from a target pixel on the liquid crystal panel 15 is deflected towards the right eye 51a and the left eye 51b of the viewer 50, an angle of the light deflected range is θd. In other words, when the viewer 50 moves to the left in FIG. 3B, the light emitted from the liquid crystal panel 15 is deflected at an angle with respect to a deflection center C1, but when the viewer 50 moves to the right in FIG. 3B, the light emitted from the liquid crystal panel 15 is deflected at an angle with respect to a deflection center C2.

When a distance D1 between the right eye 51a and the left eye 51b of the viewer 50 (hereinafter, referred to as an "eye width D1") is compared to a range D2 in which the head of the viewer 50 can be moved (hereinafter, referred to as a "movable range D2"), the movable range D2 is larger than the eye width D1. Therefore, when the head of the viewer 50 moves from the above-described predetermined position, the optical deflector 19 needs to deflect the light in a range having the relatively large angle θd. For example, if the eye width D1 of the viewer 50 is 60 mm and a visual distance D3 between the viewer 50 and the liquid crystal panel 15 is 300 mm, the angle θc has a value of 16 degrees. Furthermore, for example, if the movable range D2 is 166 mm, the angle θd has a value of 31 degrees. This means that a deflection angle required for the optical deflector 19 under the assumption that the head of the viewer 50 can move from the above-described predetermined position is larger than a deflection angle required for the optical deflector 19 under the assumption that the head of the viewer 50 is fixed on the above-described predetermined position.

A deflection speed required to deflect light emitted from the liquid crystal panel 15 towards the right eye 51a and the left eye 51b of the viewer 50 is significantly different from a deflection speed required to deflect light emitted from the liquid crystal panel 15 to be adjusted according to the move of the head of the viewer 50. As described above, displaying high-quality 3D images on the liquid crystal panel 15 requires switching at a relatively high speed (for example, at a frame rate of 120 Hz) between a right-eye image and a left-eye image to be displayed on the liquid crystal panel 15. Therefore, the deflection speed required to deflect light emitted from the liquid crystal panel 15 towards the right eye 51a and the left eye 51b of the viewer 50 needs to be relatively high. On the other hand, the deflection speed required to deflect light emitted from the liquid crystal panel 15 to be adjusted according to the move of the head of the viewer 50 may be relatively low.

Therefore, according to the present embodiment, the first optical deflector 13 deflects light at a relatively small deflection angle and at a relatively high deflection speed, in order to deflect the light towards the right eye 51a and the left eye 51b of the viewer 50. On the other hand, the second optical deflector 14 deflects light at a relatively large deflection angle and at a relatively slow deflection speed, in order to adjust the light according to the move of the head of the viewer 50.

Here, light deflection control performed by the first optical deflector 13 and second optical deflector 14 is described. As shown in FIG. 2A, when the head of the viewer 50 is fixed on the predetermined position, the light incident on the first optical deflector 13 is deflected by the first optical deflector 13 in a range having the angle θa with respect to the deflection center C0. The light deflected by the first optical deflector 13 is not deflected by the second optical deflector 14, for example, and is deflected alternately to the right eye 51a and the left eye 51b of the viewer 50.

As shown in FIG. 2B, when the head of the viewer 50 moves from the predetermined position, the light incident on the first optical deflector 13 is deflected by the first optical deflector 13 in a range having the angle θa with respect to the deflection center C0. After that, the light deflected by the first optical deflector 13 is further deflected by the second optical deflector 14 in a range having the angle θb with respect to the deflection center C1. Here, the deflection center C1 varies according to the position of the head of the viewer 50. As a result, the light deflected by the first optical deflector 13 and the second optical deflector 14 is deflected alternately to the right eye 51a and the left eye 51b of the viewer 50.

Furthermore, according to the present embodiment, every time the first optical deflector 13 switches between light deflection directions, one of the first optical deflection layer 13a and the second optical deflection layer 13b is controlled not to deflect the light. Here, the deflection direction is a traveling direction of deflected light. Each of FIGS. 4A and 4B is a diagram for explaining light deflection control performed by the first optical deflector 13.

Figure 4A:
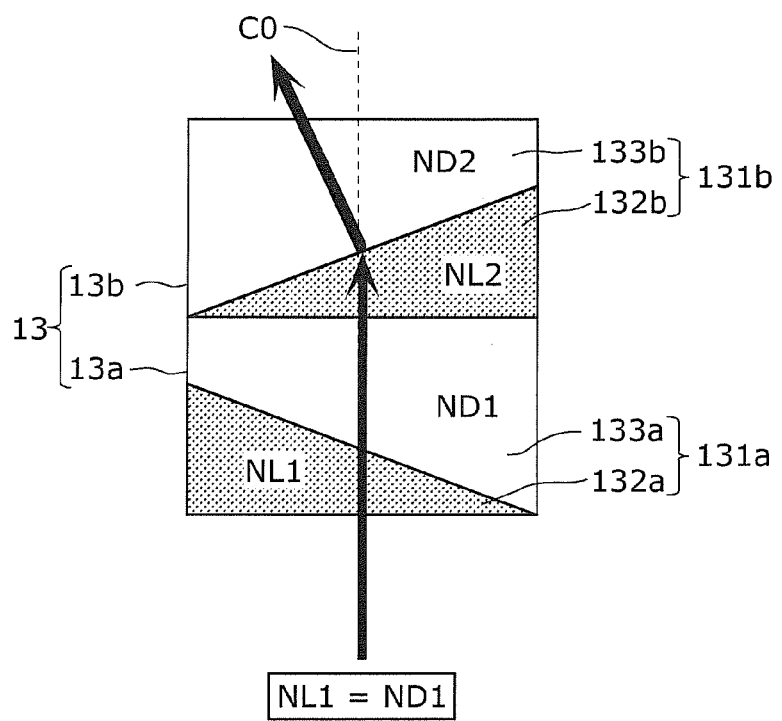
FIG. 4A is a diagram for explaining light deflection control performed by the first optical deflector.

As shown in FIG. 4A, when a light deflection direction of the first optical deflector 13 is controlled to a first deflection direction, the control unit 17 controls respective refractive indexes of the liquid crystal deflection elements 131a in the first optical deflection layer 13a to prevent the first optical deflection layer 13a from defecting light. Here, the control unit 17 modulates the respective refractive indexes NL1 of the liquid crystals 132a, so that a refractive index NL1 of each of the liquid crystals 132a is the same as a refractive index ND1 of a corresponding dielectric 133a (for example, NL1=ND1=1.61) in the first optical deflection layer 13a. In addition, the control unit 17 modulates the respective refractive indexes NL2 of the liquid crystals 132b, so that a refractive index NL2 of each of the liquid crystals 132b is different from a refractive index ND2 of a corresponding dielectric 133b (for example, NL2=1.51, ND2=1.61) in the second optical deflection layer 13b.

Figure 4B:
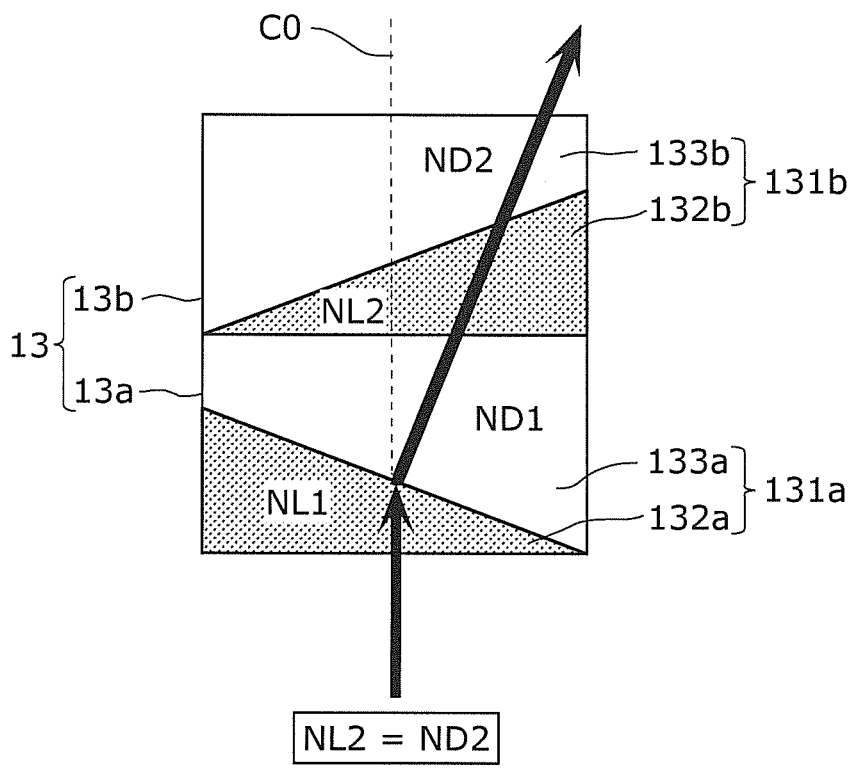
FIG. 4B is a diagram for explaining light deflection control performed by the first optical deflector.

As shown in FIG. 4B, when a light deflection direction of the first optical deflector 13 is controlled to a second deflection direction different from the first deflection direction, the control unit 17 controls the respective refractive indexes of the liquid crystal deflection elements 131b in the second optical deflection layer 13b to prevent the second optical deflection layer 13b from defecting light. Here, the control unit 17 modulates the respective refractive indexes NL2 of the liquid crystals 132b, so that a refractive index NL2 of each of the liquid crystals 132b is the same as a refractive index ND2 of a corresponding dielectric 133b (for example, NL2=ND2=1.61) in the second optical deflection layer 13b. In addition, the control unit 17 modulates the respective refractive indexes NL1 of the liquid crystals 132a, so that a refractive index NL1 of each of the liquid crystals 132a is different from a refractive index ND1 of a corresponding dielectric 133a (for example, NL1=1.51, ND1=1.61) in the first optical deflection layer 13a.

Such light deflection control produces the following effects. For example, when W denotes a width of a liquid crystal 132a in the first optical deflector 13 and λ denotes a light wavelength, light traveling from the first optical deflector 13 spreads at a half angle of λ/W (radian) due to diffraction. When 3D images are to be displayed on the liquid crystal panel 15, a right-eye image and a left-eye image are alternately incident on the right eye 51a and the left eye 51b, respectively, for the viewer 50. In this situation, when the light spreads widely, so-called crosstalk occurs so that the right-eye image is incident also on the left eye 51b of the viewer 50, and the left-eye image is incident also on the right eye 51a of the viewer 50.

According to the present embodiment, for example, when the light deflection direction of the first optical deflector 13 is controlled to the first deflection direction, the liquid crystals 132b in the second optical deflection layer 13b serve as an opening for the light. Therefore, the light passing through the second optical deflection layer 13b spreads widely due to diffraction. However, in the first optical deflection layer 13a, a refractive index NL1 of each of the liquid crystals 132a is the same as a refractive index ND1 of a corresponding dielectric 133a. Therefore, the first optical deflection layer 13a serves as a flat plane having such homogeneous refractive indexes for the light. As a result, the light passing through the first optical deflection layer 13a does not spread due to diffraction.

Likewise, when the light deflection direction of the first optical deflector 13 is controlled to the second deflection direction, the liquid crystals 132a in the first optical deflection layer 13a serve as an opening for the light. Therefore, the light passing through the first optical deflection layer 13a spreads due to diffraction. However, in the second optical deflection layer 13b, a refractive index NL2 of each of the liquid crystals 132b is the same as a refractive index ND2 of a corresponding dielectric 133b. Therefore, the second optical deflection layer 13b serves as a flat plane having such homogeneous refractive indexes for the light. As a result, the light passing through the second optical deflection layer 13b does not spread due to diffraction.

As described above, according to the present embodiment, every time the first optical deflector 13 switches between light deflection directions, one of the first optical deflection layer 13a and the second optical deflection layer 13b is controlled not to deflect the light. It is therefore possible to suppress light from spreading due to diffraction and to suppress occurrence of crosstalk. It should be noted that each of the first optical deflection layer 13a and the second optical deflection layer 13b can deflect light. In this case, it is possible to further increase the light deflection angles of the first optical deflector 13.

Next, a description is given for a mechanism of operations performed by the liquid crystal display device 1 according to the present embodiment with reference to FIG. 1A and 1B. FIG. 1A shows a state where the head of the viewer 50 is fixed on a predetermined position, while FIG. 1B shows a state where the head of the viewer 50 moves from the predetermined position.

Regarding the pair of the stereo cameras 16a and 16b, the stereo camera 16 captures an image of the right eye 51a of the viewer 50 viewing the liquid crystal panel 15, and the stereo camera 16b captures an image of the left eye 51b of the viewer 50. Based on a difference between the image captured by the stereo camera 16a and the image captured by the stereo camera 16b, the control unit 17 detects the position of the head of the viewer 50 and positions of the right eye 51a and the left eye 51b of the viewer 50. Based on the detection results, the control unit 17 controls respective voltages applied to all of the liquid crystals 132a and 132b in the first optical deflector 13 to modulate the respective refractive indexes of the liquid crystals 132a and 132b. In addition, based on the detection results, the control unit 17 controls respective voltages applied to the liquid crystals 142 in the second optical deflector 14 to modulate the respective refractive indexes of the liquid crystals 142.

Light emitted from the light source 11 is incident on the one lateral surface 12a of the light guide plate 12, propagates through the light guide plate 12, is bent substantially perpendicular by an uneven portion 12 formed on the bottom surface of the light guide plate 12, and then travels from the top surface of the light guide plate 12. The light, which travels from the principal surface 12c of the light guide plate 12, passes through the first optical deflector 13 and the second optical deflector 14 to be incident on the liquid crystal panel 15. The light, which is emitted from the liquid crystal panel 15, is collected alternately onto the right eye 51a and the left eye 51b of the viewer 50. The light travelling from the second optical deflector 14 is incident on the liquid crystal panel 15, so that an image (in other words, the right-eye image and the left-eye image) is formed on the liquid crystal panel 15.

Until a predetermined time duration has elapsed since the start of lighting of the light source 11, the control unit 17 modulates the respective refractive indexes of all of the liquid crystals 132a and 133a in the first optical deflector 13 and the respective refractive indexes of the liquid crystals 142 in the second optical deflector 14. As a result, the light travelling from the principal surface 12c of the light guide plate 12 is deflected by the first optical deflector 13 and the second optical deflector 14 towards the right eye 51a of the viewer 50. The light travelling from the second optical deflector 14 is collected onto the right eye 51a of the viewer 50 after passing through the liquid crystal panel 15 as shown by a solid line in FIGS. 1A and 1B. The control unit 17 controls the liquid crystal panel 15 to display the right-eye image at a timing for deflecting the light towards the right eye 51a of the viewer 50.

After elapse of the predetermined time duration, the control unit 17 modulates the respective refractive indexes of the liquid crystals 132a and 133a in the first optical deflector 13 and the respective refractive indexes of the liquid crystals 142 in the second optical deflector 14. As a result, the light travelling from the principal surface 12c of the light guide plate 12 is deflected by the first optical deflector 13 and the second optical deflector 14 towards the left eye 51b of the viewer 50. The light travelling from the second optical deflector 14 is collected onto the left eye 51b of the viewer 50 after passing through the liquid crystal panel 15 as shown by a broken line in FIGS. 1A and 1B. The control unit 17 controls the liquid crystal panel 15 to display the left-eye image different from the right-eye image, at a timing for deflecting the light towards the left eye 51b of the viewer 50.

As described above, the control unit 17 switches between a light deflection direction of the first optical deflector 13 and a light deflection direction of the second optical deflector 14 in chronological order. As a result, the light emitted from the liquid crystal panel 15 is collected in chronological order onto the right eye 51a and the left eye 51b, alternately, of the viewer 50. When a right-eye image and a left-eye image are alternately incident on the right eye 51a and the left eye 51b of the viewer 50, the viewer 50 can perceive the images displayed on the liquid crystal panel 15 as 3D images.

According to the present embodiment, each of light deflection angles of the first optical deflector 13 is relatively small.

Therefore, heights H1 of all the liquid crystals 132a and 132b in the first optical deflector 13 are low, the widths W1 of all the liquid crystals 132a and 132b may be large. In general, as a width of a liquid crystal is smaller, light spreads more widely due to diffraction. In the present embodiment, however, a degree of decreasing the widths of all the liquid crystals 132a and 132b is reduced. It is therefore possible to suppress light from spreading due to diffraction, thereby suppressing occurrence of crosstalk.

Moreover, respective light deflection speeds of the second optical deflector 14 are relatively small. Therefore, even if the respective inclination angles θ2 of the inclined surfaces of the liquid crystals 142 in the second optical deflector 14 are increased, it is possible to increase the respective heights H2 and the respective widths W2 of the liquid crystals 142. As a result, in the same manner as described above, it is possible to suppress light from spreading due to diffraction, thereby suppressing occurrence of crosstalk.

It should be noted that it has been described in the present embodiment that the light guide plate 12 has the uneven prism 12b on the bottom surface. However, the present disclosure is not limited to the structure. Any other structure having the same function may be used. It should be noted in the present embodiment that the light emitting unit 18 consists of the light source 11 and the light guide plate 12. However, the present disclosure is not limited to the structure. The light guide plate 12 may be replaced by any other part having the same function as the light guide plate 12.

It should also be noted that it has been described in the present embodiment that a height H2 of each of the liquid crystals 142 in the second optical deflector 14 is set to be greater than each of a height H1 of a corresponding liquid crystal 132a and a height H1 of a corresponding liquid crystal 132b in the first optical deflector 13, so that a light deflection angle of each of the liquid crystal deflection elements in the second optical deflector 14 is larger than a light deflection angle of a corresponding liquid crystal deflection element in the first optical deflector 13. However, the present disclosure is not limited to the structure, and other structures may be used. For example, it is also possible that each of change widths of refractive indexes of the liquid crystals 142 in the second optical deflector 14 is greater than a change width of a refractive index of a corresponding liquid crystal 132a and a change width of a refractive index of a corresponding liquid crystal 132b in the first optical deflector 13. As a result, it is possible to manufacture the second optical deflector 14 thinner.

It should also be noted that it has been described in the present embodiment that the first optical deflector 13 is located closer to the light guide plate 12, and the second optical deflector 14 is located closer to the liquid crystal panel 15. However, on the contrary, it is also possible that the first optical deflector 13 is located closer to the liquid crystal panel 15, and the second optical deflector 14 is located closer to the light guide plate 12.

It should also be noted that it has been described in the present embodiment that the first optical deflector 13 includes two stacked optical deflection layers which are the first optical deflection layer 13a and the second optical deflection layer 13b. However, the first optical deflector 13 may include three or more stacked optical deflection layers. In this case, in the same manner as the described above, it is possible to control at least one of the optical deflection layers not to deflect light even time the first optical deflector 13 switches between light deflection directions.

It should also be noted that it has been described in the present embodiment that the liquid crystal display device 1 mainly serves as a 3D display device. When a right-eye image and a left-eye image displayed on the liquid crystal panel 15 are the same image, the viewer 50 perceives the images as a 2D image, but other people except the viewer 50 cannot perceive the images on the liquid crystal panel 15. Therefore, in this case, the liquid crystal display device 1 serves as a privacy display device.

(Embodiment 2)

Figure 5:
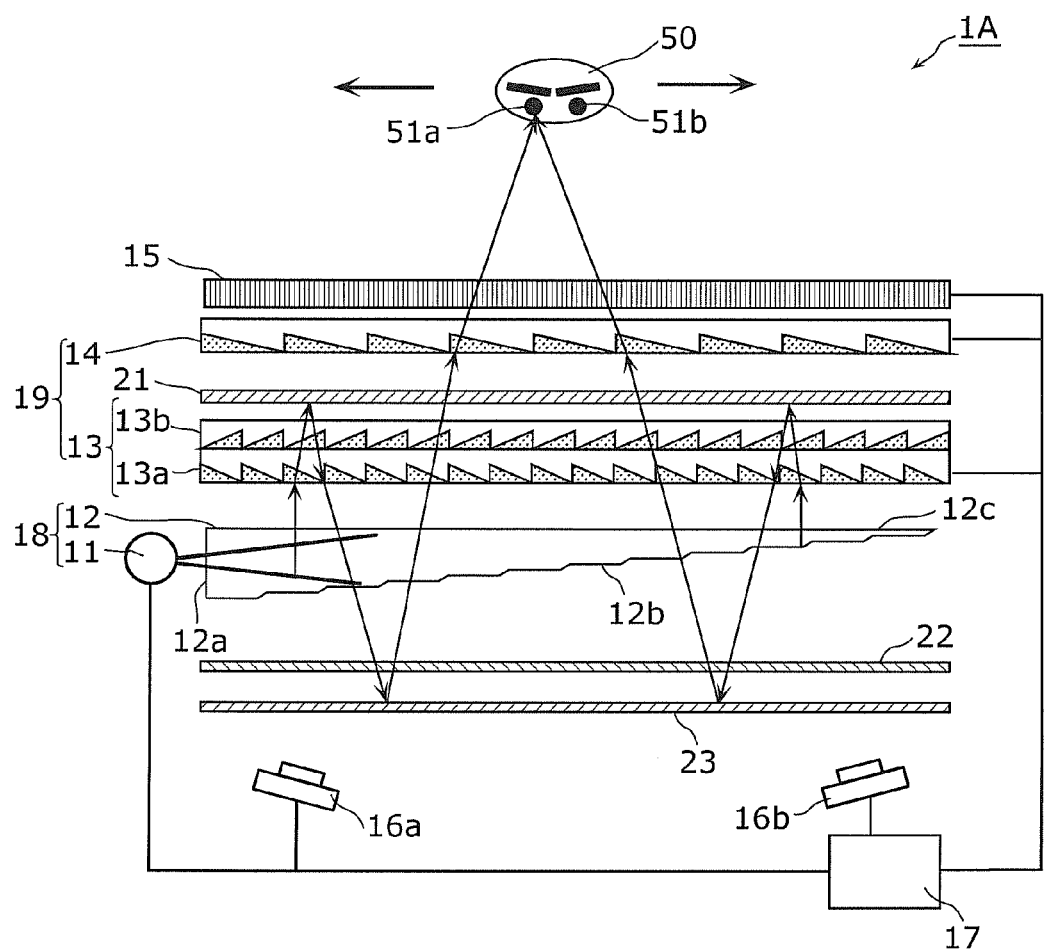
FIG. 5 is a cross-sectional view of a liquid crystal display device according to Embodiment 2.

FIG. 5 is a cross-sectional view of a liquid crystal display device 1A according to Embodiment 2. In the following embodiments, the same reference numerals in Embodiment 1 are assigned to identical structural elements in the other embodiments, and therefore the identical structural elements are not described again.

In addition to the structural elements in the liquid crystal display device 1 according to Embodiment 1, the liquid crystal display device 1A in the figure further includes a polarizing reflective sheet 21, a λ/4 sheet 22, and a reflective plate 23.

The polarizing reflective sheet 21 is provided between the first optical deflector 13 and the second optical deflector 14. The polarizing reflective sheet 21 has characteristics of reflecting light in the first polarization direction (for example, a direction perpendicular to the sheet of FIG. 5), and transmitting light in the second polarization direction perpendicular to the first polarization direction (for example, a direction along the sheet of FIG. 5).

The reflective plate 23 is provided closer to the bottom surface of the light guide plate 12. The reflective plate 23 has a function of specularly reflecting incident light.

The λ/4 sheet 22 is provided between the light guide plate 12 and the reflective plate 23. The λ/4 sheet 122 is a wave plate which has a function to convert linear polarization with a given wavelength into circular polarization (or convert circular polarization into linear polarization), and has a function to generate phase difference of ¼ of wavelength λ (that is, phase difference of 90 degrees) between linear polarization which oscillate in a direction vertical to each other.

Next, a description is given for a mechanism of operations performed by the liquid crystal display device 1A according to the present embodiment. Here, light emitted from the light source 11 is polarized to the first polarization direction. Light emitted from the light source 11 is incident on the one lateral surface 12a of the light guide plate 12, propagates through the light guide plate 12, is bent substantially perpendicular by an even part 12b formed on the bottom surface of the light guide plate 12, and then travels from the principal surface 12c of the light guide plate 12. The light traveling from the principal surface 12c of the light guide plate 12 is deflected by the first optical deflector 13 to be incident on the polarizing reflective sheet 21. The light incident on the polarizing reflective sheet 21 is polarized into the first polarization direction, so that it is reflected by the polarizing reflective sheet 21. The light reflected by the polarizing reflective sheet 21 is further deflected by the first optical deflector 13, then passes through the light guide plate 12, and is incident on the λ/4 sheet 22. This light is converted from linear polarization to circular polarization by passing through the λ/4 sheet 22, and converted from circular polarization to linear polarization by being specularly reflected by the reflective plate 23 to pass through the λ/4 sheet 22. The light travelling from the λ/4 sheet 22, which is polarized to the second polarization direction, passes through the light guide plate 12 and is further deflected by the first optical deflector 13. The light travelling from the first optical deflector 13, which is polarized to the second polarization direction, passes through the polarizing reflective sheet 21. The light traveling from the polarizing reflective sheet 21 is deflected by the second optical deflector 14 and then incident on the liquid crystal panel 15.

As described above, in the liquid crystal display device 1A according to the present embodiment, light incident on the first optical deflector 13 is provided from the first optical deflector 13 after passing through the first optical deflector 13 three times. The light is deflected every time passing through the first optical deflector 13. Therefore, such light has a light deflection angle of the first optical deflector 13 which is three times as large as the light deflection angle in the case where light passes through the first optical deflector 13 only once. Therefore, the light maximum deflection angle for the first optical deflector 13 can be decreased. As a result, it is possible to set the respective heights of the liquid crystals in the first optical deflector 13 to be low, thereby achieving higher-speed deflection.

It should be noted that if the first optical deflector 13 has polarization characteristics of deflecting light only to the first polarization direction, the light travelling in the first polarization direction passes through the first optical deflector 13 twice. As a result, it is possible to increase the light deflection angle of the first optical deflector 13 to be twice as large as the light deflection angle in the case where light travelling in the first polarization direction passes through the first optical deflector 13 only once.

Moreover, when the liquid crystal panel 15 has polarization characteristics of transmitting only light traveling in a specific polarization direction and the polarizing reflective sheet 21 has deflection characteristics of reflecting light traveling in a polarization direction perpendicular to the specific polarization direction, light travelling from the polarizing reflective sheet 21 can pass through the liquid crystal panel 15. When the polarizing reflective sheet 21 has polarization characteristics of reflecting light traveling in the above specific polarization direction, the λ/2 sheet is provided between the polarizing reflective sheet 21 and the liquid crystal panel 15. As a result, light travelling from the polarizing reflective sheet 21 can pass through the liquid crystal panel 15. The λ/2 sheet is a wave plate which has a function to convert linear polarization with a given oscillation direction into linear polarization with a oscillation direction orthogonal to the oscillation direction of the linear polarization, and has a function to generate phase difference of ½ of wavelength λ (that is, phase difference of 180 degrees) between linear polarization which oscillate in a direction vertical to each other.

(Embodiment 3)

Figure 6:
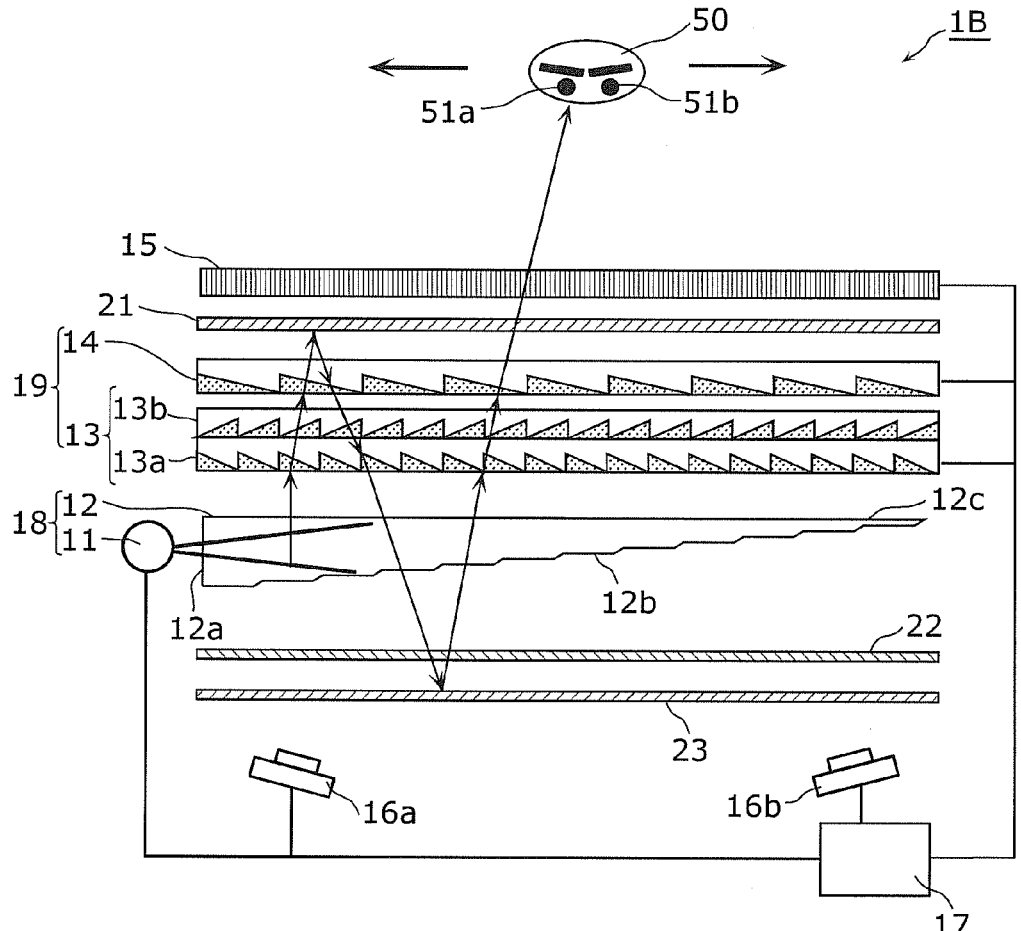
FIG. 6 is a cross-sectional view of a liquid crystal display device according to Embodiment 3.

FIG. 6 is a cross-sectional view of a liquid crystal display device 1B according to Embodiment 3. In the liquid crystal display device 1B according to the present embodiment, the polarizing reflective sheet 21 is provided between the second optical deflector 14 and the liquid crystal panel 15. The other structure of the liquid crystal display device 1B is the same as that in Embodiment 2.

According to the present embodiment, light travelling from the principal surface 12c of the light guide plate 12 passes through the first optical deflector 13 three times and the second optical deflector 14 three times. Therefore, such light has a light deflection angle of the first optical deflector 13 which is three times as large as the light deflection angle in the case where light passes through the first optical deflector 13 only once. Furthermore, such light has a light deflection angle of the second optical deflector 14 which is three times as large as the light deflection angle in the case where light passes through the second optical deflector 14 only once. As a result, it is possible to set the respective heights of the liquid crystals in the second optical deflector 14 to low, thereby increasing light deflection speeds of the second optical deflector 14.

It should be noted that it has been described in the present embodiment that the first optical deflector 13 and the second optical deflector 14 are provided closer to the principal surface 12c of the light guide plate 12. However, it is also possible that the first optical deflector 13 and the second optical deflector 14 are provided closer to the bottom surface of the light guide plate 12.

It should also be noted that it has been described in the present embodiment that the light guide plate 12 is provided so that the principal surface 12c of the light guide plate 12 faces the first optical deflector 13. However, it is also possible that the light guide plate 12 is located up-side down so that the principal surface 12c of the light guide plate 12 faces the λ/4 sheet 22. In this case, light emitted from the light source 11 is polarized to the second polarization direction.

(Embodiment 4)

Figure 7A:
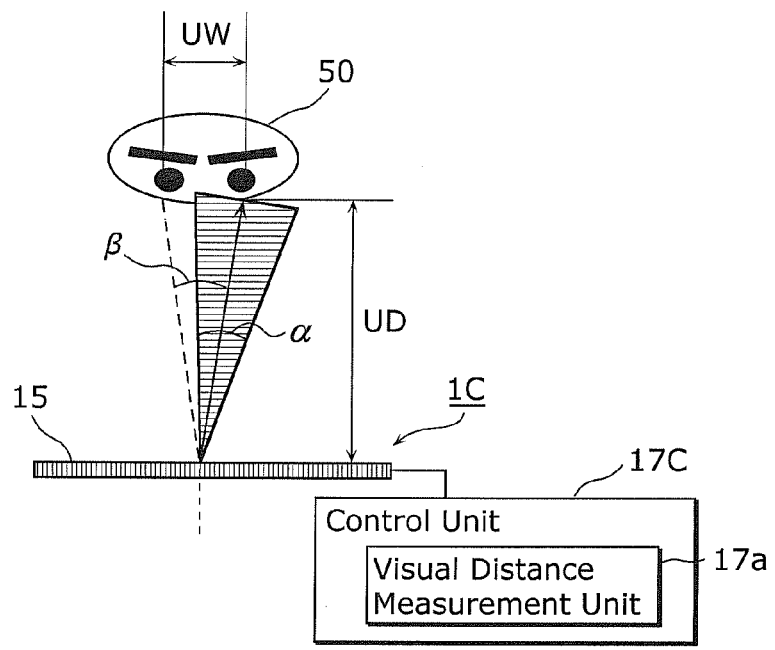
FIG. 7A is a diagram for explaining light deflection control performed by a liquid crystal display device according to Embodiment 4.
Figure 7B:
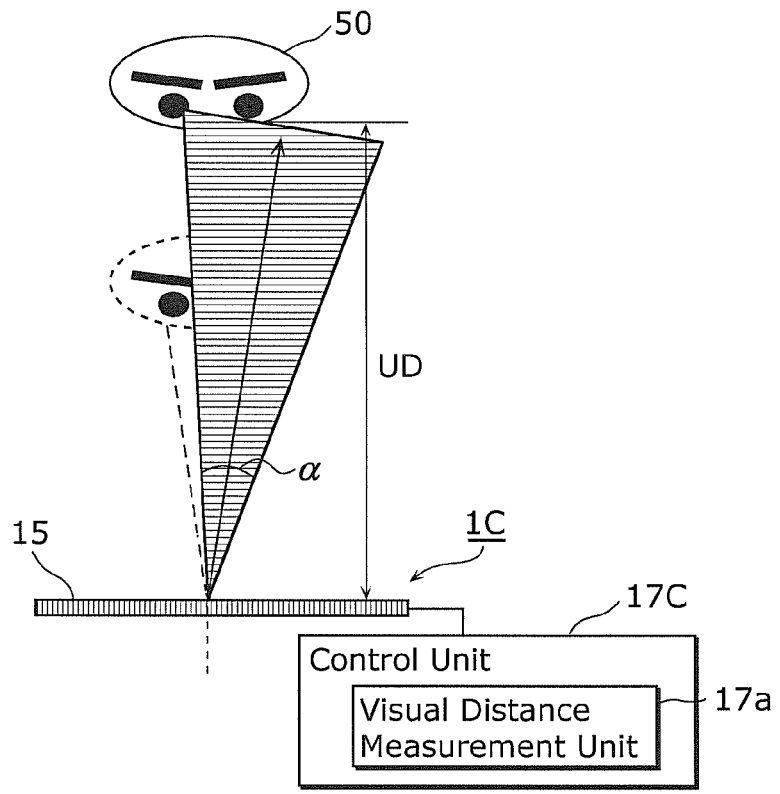
FIG. 7B is a diagram for explaining light deflection control performed by the liquid crystal display device according to Embodiment 4.

Each of FIGS. 7A and 7B is a diagram for explaining light deflection control performed by a liquid crystal display device 1C according to Embodiment 4. The structure of the liquid crystal display device 1C according to the present embodiment is the same as that of the liquid crystal display device 1 according to Embodiment 1.

As described above, when light emitted from the liquid crystal panel 15 spreads widely, a right-eye image is incident also on the left eye 51b of the viewer 50 and a left-eye image is incident also on the right eye 51a of the viewer 50. As a result, so-called crosstalk occurs. First, the crosstalk problem is explained. FIG. 7A shows a state where crosstalk does not occur, while FIG. 7B shows a state where crosstalk occurs. If light emitted from the liquid crystal panel 15 does not spread, an angle of a range in which the light emitted from the liquid crystal panel 15 is deflected is an angle β in FIG. 7, it is possible that a right-eye image is incident on the right eye 51a of the viewer 50 and a left-eye image is incident on the left eye 51b of the viewer 50. When UW denotes a distance between the right eye 51a and the left eye 51b of the viewer 50, and UD denotes a visual distance between the viewer 50 and the liquid crystal panel 15, the angle β between the both eyes is determined by the following Equation 1.

$$\beta = 2 \times \arctan(UW/(2 \times UD)) \quad \text{(Equation 1)}$$

As presented in Equation 1, the angle β between the both eyes is an angle determined by the distance UD between the right eye 51a and the left eye 51b of the viewer 50 and the visual distance UW. As described above, the optical deflector 19 is controlled to deflect light emitted from the liquid crystal panel 15 in a range having the angle β, so that a right-eye image is incident on the right eye 51a of the viewer 50 and a left-eye image is incident on the left eye 51b of the viewer 50.

However, in practice, light emitted from the liquid crystal panel 15 spreads as shown in a hatched part in FIGS. 7A and 7B. When LD denotes a width of light emitted from the liquid crystal panel 15 and λ denotes a light wavelength, a spread angle α at which the light emitted from the liquid crystal panel 15 spreads due to diffraction until the light is incident on the eye of the viewer 50 is determined by the following Equation 2.

$$\alpha = 2 \times (\lambda/LD) \quad \text{(Equation 2)}$$

FIG. 7A shows a situation where the spread angle a is equal to or smaller than twice as large as the angle β between the both eyes (in other words, a half angle of the spread angle α is equal to or smaller than the angle β between the both eyes). In this case, as shown in FIG. 7A, even if light travelling towards the left eye 51b of the viewer 50 spreads, the light is not incident on the right eye 51a of the viewer 50. As a result, crosstalk does not occur. However, as shown in FIG. 7B, if the visual distance UD between the viewer 50 and the liquid crystal panel 15 is longer, a value of the angle β between the both eyes is smaller as understood by the above Equation 1. Therefore, as shown in FIG. 7B, the spread angle a is equal to or larger than twice as large as the both-eye angle β (in other words, a half angle of the spread angle a is equal to or larger than the angle β between the both eyes). As a result, a part of the light travelling towards the left eye 51b of the viewer 50 is incident also on the right eye 51a of the viewer 50, thereby causing crosstalk.

According to the present embodiment, in order to prevent such crosstalk occurrence, the control unit 17C controls the optical deflector 19 in the following manner. The control unit 17C has a visual distance measurement unit 17a. The visual distance measurement unit 17a measures the visual distance UD between the viewer 50 and the liquid crystal panel 15, based on the detection results of the pair of the stereo cameras 16a and 16b. The control unit 17C calculates the angle β between the both eyes by using the above-presented Equation 1, based on the distance UW between the right eye 51a and the left eye 51b of the viewer 50 and the visual distance UW measured by the visual distance measurement unit 17a. In addition, the control unit 17c calculates the spread angle a by using the above-presented Equation 2.Here, the calculation of the spread angle a uses a wavelength λ of light having the longest wavelength (for example, red light) from among lights emitted from the light source 11 used in the liquid crystal display device 1C.

When the spread angle a is larger than twice as large as the both-eye angle β (in other words, a half angle of the spread angle a is larger than the both-eye angle β), the control unit 17C controls an angle of a range in which the first optical deflector 13 deflects light, to be equal to or larger than the spread angle α. When the spread angle α is smaller than twice as large as the both-eye angle β (in other words, the half angle of the spread angle a is smaller than the both-eye angle β), the control unit 17C controls the angle of the range in which the first optical deflector 13 deflects light, to be equal to or larger than the both-eye angle β. Such deflection control can suppress occurrence of crosstalk, even if the visual distance UD between the viewer 50 and the liquid crystal panel 15 is changed.

It should be noted that it has been described in the present embodiment that the liquid crystal display device 1C has the same structure as that of the liquid crystal display device 1 according to Embodiment 1, but it may have the same structure as that of the liquid crystal display device 1A according to Embodiment 2.

(Embodiment 5)

Figure 8A:
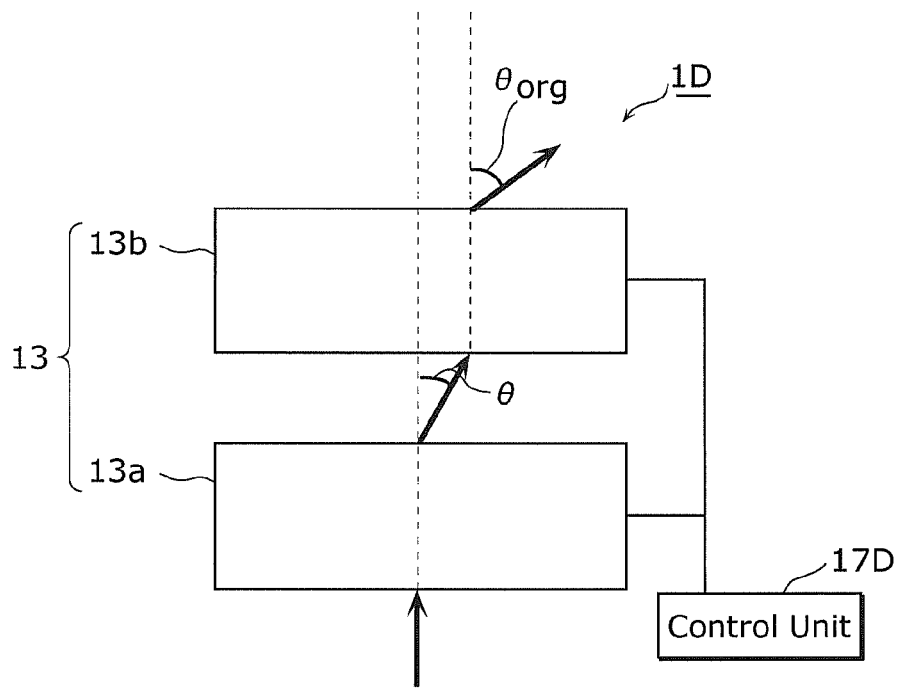
FIG. 8A is a diagram for explaining light deflection control performed by a liquid crystal display device according to Embodiment 5.
Figure 8B:
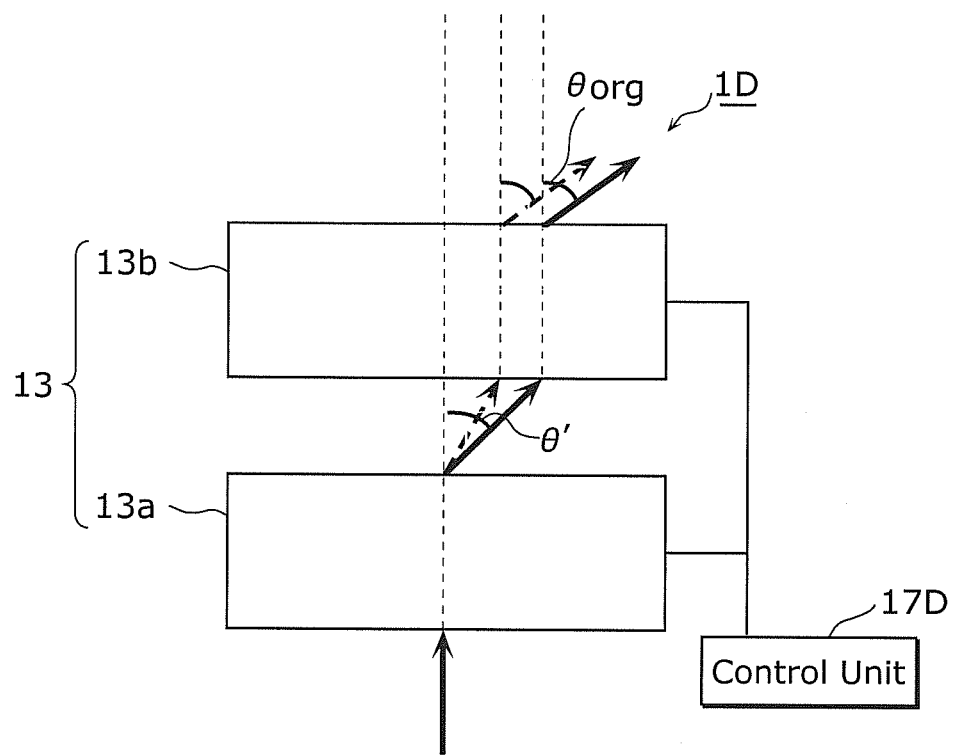
FIG. 8B is a diagram for explaining light deflection control performed by the liquid crystal display device according to Embodiment 5.

Each of FIGS. 8A and 8B is a diagram for explaining light deflection control performed by a liquid crystal display device 1D according to Embodiment 5. The structure of the liquid crystal display device 1D according to the present embodiment is the same as that of the liquid crystal display device 1 according to Embodiment 1.

In general, when a laser source is used as the light source, there is a risk of deteriorating image quality of images displayed on the liquid crystal panel 15 due to speckle. In order to address the above problem, in the present embodiment, a control unit 17D changes a light deflection angle of the first optical deflection layer 13a and a light deflection angle of the second optical deflection layer 13b, every time the first optical deflection layer 13a deflects light to a specific deflection direction.

When the light deflection angle of the first optical deflector 13 is to be controlled to θorg, the control unit 17D determines a light deflection angle θfirst of the first optical deflection layer 13a by the following Equation 3, and determines a light deflection angle θsecond of the second optical deflection layer 13b by the following Equation 4.

$$\theta\text{first} = \theta\text{org} + d \quad \text{(Equation 3)}$$

$$\theta\text{second} = \theta\text{org} - d \quad \text{(Equation 4)}$$

In the above Equations 3 and 4, d is a value determined by the control unit 17D. The control unit 17D changes the value d, every time the first optical deflector 13 deflects light at the deflection angle θorg. Thereby, even if all of the light deflection angles θorg of the first optical deflector 13 are the same, the light deflection angle θfirst of the first optical deflection layer 13a is different from the light deflection angle θsecond of the second optical deflection layer 13b. Therefore, it is possible to change a path of light at the first optical deflector 13.

FIG. 8A shows a situation where the value d determined by the control unit 17C is relatively small. Light incident on the first optical deflector 13 is deflected by the first optical deflection layer 13a and the second optical deflection layer 13b, and then transmitted from the first optical deflector 13.

FIG. 8B shows a situation where the value d determined by the control unit 17C is relatively large. A light deflection angle θ' of the first optical deflection layer 13a which is shown in FIG. 8B is larger than a light deflection angle θ of the first optical deflection layer 13a which is shown in FIG. 8A. On the other hand, a light deflection angle of the second optical deflection layer 13b which is shown in FIG. 8B is smaller than a light deflection angle of the second optical deflection layer 13b which is shown in FIG. 8A. Therefore, the light deflection angle θorg of the first optical deflector 13 which is shown in FIG. 8B is the same as the light deflection angle θorg of the first optical deflector 13 which is shown in FIG. 8A. In FIG. 8B, the light path in FIG. 8A is shown by a broken-line arrow.

Therefore, according to the present embodiment, it is possible to change a path of light in the first optical deflector 13, keeping constant the light deflection angle of the overall first optical deflector 13. Therefore, when a laser light source is used as the light source 11, it is possible to suppress occurrence of speckle.

It should also be noted that it has been described in the present embodiment that the first optical deflector 13 includes two stacked optical deflection layers which are the first optical deflection layer 13a and the second optical deflection layer 13b. However, the first optical deflector 13 may include three or more stacked optical deflection layers. In this case, it is possible that the control unit 17D controls at least two of the optical deflection layers to change respective light deflection angles, every time the first optical deflector 13 deflects light to a specific deflection direction.

(Embodiment 6)

Figure 9:
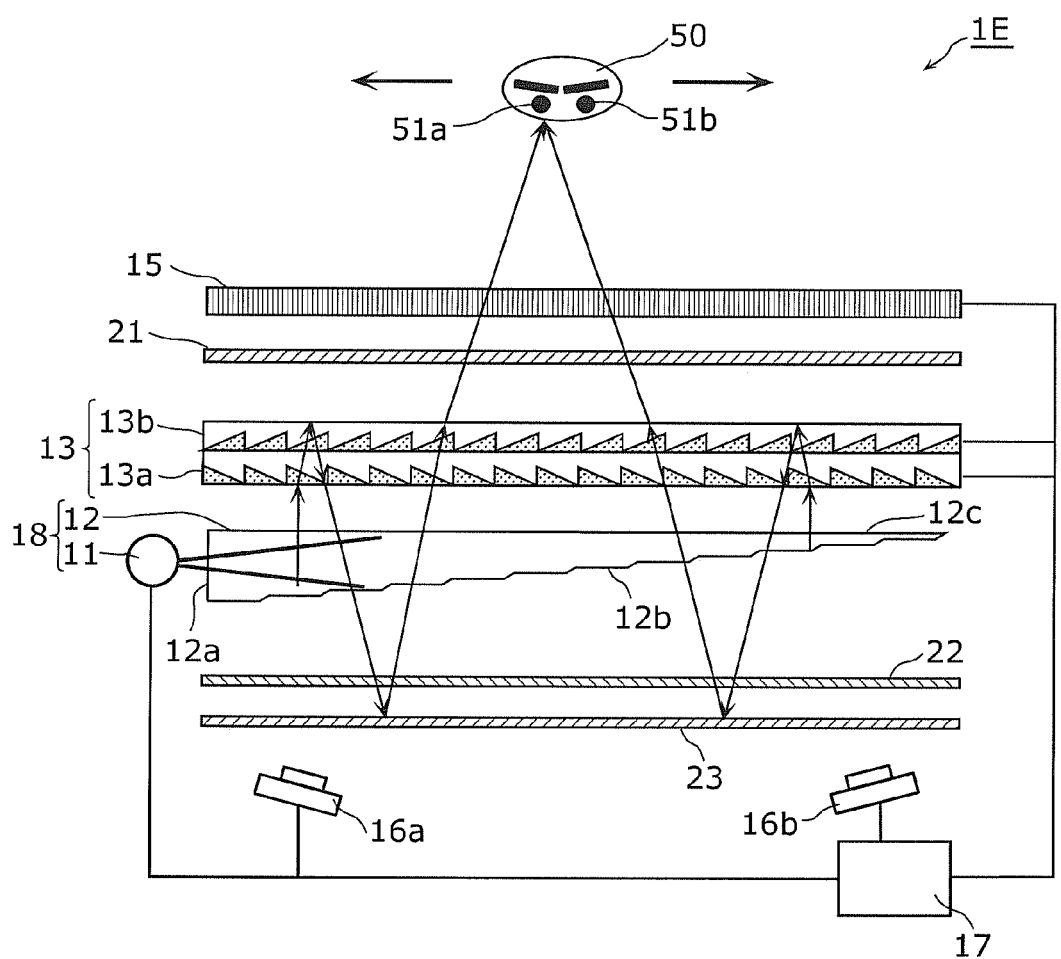
FIG. 9 is a cross-sectional view of a liquid crystal display device according to Embodiment 6.

FIG. 9 is a cross-sectional view of a liquid crystal display device 1E according to Embodiment 6.In the present embodiment, the second optical deflector 14 is eliminated from the structural elements of the liquid crystal display device 1A according to Embodiment 2. According to the present embodiment, the first optical deflector 13 includes the first optical deflection layer 13a and the second optical deflection layer 13b which are stacked in a direction from the light incident side to the light emitting side. Like Embodiment 1, every time the first optical deflector 13 switches a light deflection direction, control is performed to prevent one of the first optical deflector 13 and the second optical deflection layer 13b from deflecting light. As a result, occurrence of crosstalk can be suppressed.

(Embodiment 7)

FIG. 10 is a cross-sectional view of a liquid crystal display device 1F according to Embodiment 7. The liquid crystal display device 1F according to the present embodiment includes a first light source 41, a first light guide plate 42, a second light source 43, a second light guide plate 44, an optical deflector 31, a liquid crystal panel 15, a polarizing reflective sheet 21, a λ/4 sheet 22, a reflective plate 23, a pair of stereo cameras 16a and 16b, and a control unit 17F.

The optical deflector 31 is provided between the second light guide plate 44 and the polarizing reflective sheet 21. For example, like the first optical deflector 13 in Embodiment 1, the optical deflector 31 includes a plurality of liquid crystal deflection elements arranged in a planar state. Each of the liquid crystal deflection elements has a liquid crystal and a dielectric, in the same manner as the liquid crystal deflection element 131a in the first optical deflection layer 13a according to Embodiment 1. Around each of the liquid crystal deflection elements, a pair of electrodes (not shown) is provided for applying a voltage to the liquid crystal. When the control unit 17F controls the voltage applied between the pair of electrodes, a distribution of refractive indexes in the liquid crystal deflection element is modulated in the same manner as described earlier.

In the optical deflector 31, incident light is two-dimensionally deflected in a predetermined direction (left-to-right direction in FIG. 10) at each part of a plane of the optical deflector 31. It is thereby possible to collect the light travelling from the optical deflector 31 onto a predetermined collection point in a three-dimensional space.

The first light source 41 includes, for example, a plurality of LEDs arranged one by one in a direction perpendicular to the sheet of FIG. 10. The first light source 41 emits light towards one lateral surface 42a of the first light guide plate 42. The second light source 43 has the same structure as that of the first light source 41, and emits light towards one lateral surface 44a of the second light guide plate 44.

The first light guide plate 42 has a top surface having an uneven prism 42b. The first light guide plate 42 has a bottom surface that is a principal surface 42c extending in a direction substantially perpendicular to the lateral surface 42a of the first light guide plate 42. The second light guide plate 44 has a bottom surface having an uneven prism 44b. The second light guide plate 44 has a top surface that is a principal surface 44c extending in a direction substantially perpendicular to the lateral surface 44a of the second light guide plate 44.

The first light guide plate 42 and the second light guide plate 44 are provided so that the uneven part 42b and the uneven part 44b face each other. The first light guide plate 42 is located closer to the reflective plate 23, while the second light guide plate 44 is located closer to the liquid crystal panel 15.

Figure 11A:
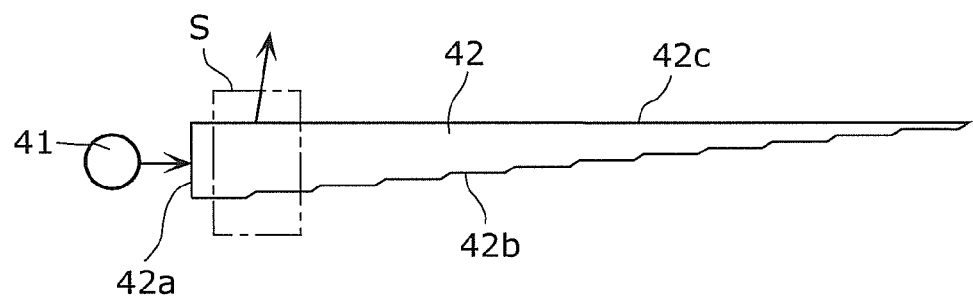
FIG. 11A is a diagram of a first light source and a first light guide plate shown in FIG. 10.
Figure 11B:
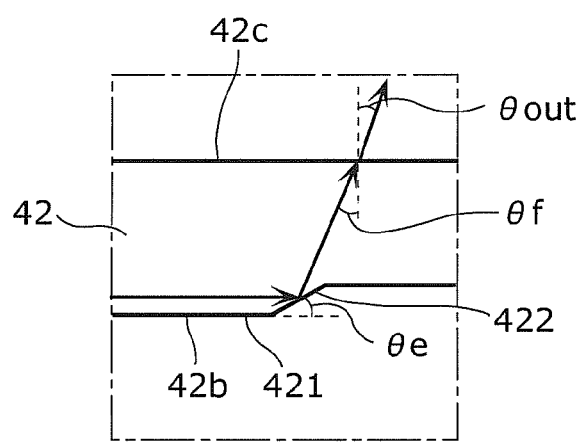
FIG. 11B is an enlarged diagram of a region S shown in FIG. 11A.

Here, the shape of the uneven part 42b of the first light guide plate 42 is described. It should be noted that the first light guide plate 42 and the second light guide plate 44 have the same shape, so that the shape of only the uneven part 42b of the first light guide plate 42 is described. FIG. 11A is a diagram of the first light source 41 and the first light guide plate 42 shown in FIG. 10. FIG. 11B is an enlarged diagram of a region S shown in FIG. 11A.

As shown in FIG. 11A, the uneven part 42b of the first light guide plate 42 includes a plurality of planar parts 421 that are arranged in a steppe shape to extend in substantially parallel to the principal surface 42c. A joint between adjacent two planar parts 421 is an inclined part 422 that is inclined to the planar parts 421. In other words, in the uneven part 42b of the first light guide plate 42, a planar part 421 and a inclined part 422 are alternately arranged side by side. Light emitted from the first light source 41 is incident on the first light guide plate 42, propagates in substantially parallel to the planar parts 421 of the first light guide plate 42, then reflected at the inclined part 422 of the first light guide plate 42, and is incident on the principal surface 42c of the first light guide plate 42 at an angle θf. Here, when θe denotes an inclination angle of the inclined part 422 of the planar parts 421, the angle θf is determined by the following Equation 5.

$$\theta f = 90 \text{ degrees} - 2\theta e \quad \text{(Equation 5)}$$

In the above Equation 5, the angle θf is 0 degree when the angle θe is 45 degrees. In this case, light emitted from the first light source 41 is incident on the principal surface 42c in a direction perpendicular to the principal surface 42c of the first light guide plate 42. If the angle θe is not 45 degrees, an angle θout at which light travelling from the principal surface 42c of the first light guide plate 42 is determined by the following Equation 6.

$$\sin(\theta \text{out}) = n \times \sin(\theta f) \quad \text{(Equation 6)}$$

In Equation 6, n denotes a refractive index of the first light guide plate 42. For example, if the angle θe is 42 degrees and n is 1.5, the angle θout is approximately 9 degrees. In this case, the light is emitted to the right on the sheet of FIG. 11B from the principal surface 42c of the first light guide plate 42. As described above, by adjusting the inclination angle θe of each of the inclined parts 422 of the first light guide plate 42, it is possible to adjust a direction of light travelling from the principal surface 42c of the first light guide plate 42. According to the present embodiment, an inclination angle θe of each of the inclined parts 422 of the first light guide plate 42 is set (for example, θe=42 degrees), so that a light traveling direction from the first light guide plate 42 is the first traveling direction (downwards to the lower right in FIG. 10). An inclination angle θe of each of the inclined parts 422 of the second light guide plate 44 is set (for example, θe=42 degrees), so that a light traveling direction from the second light guide plate 44 is the second traveling direction (downwards to the lower left in FIG. 10) that is different from the first traveling direction.

Next, a description is given for a mechanism of operations performed by a liquid crystal display device 1F according to the present embodiment. A control unit 17F (serving as a light guide plate selection unit) is capable of switching a lighting state of each of the first light source 41 and the second light source 43 between the first lighting state and the second lighting state, based on a position of the head of the viewer 50. In the first lighting state, the first light source 41 is turned ON and the second light source 43 is turned OFF, so that light emitted from the first light source 41 is incident on the lateral surface 42a of the first light guide plate 42. In the second lighting state, the first light source 41 is turned OFF and the second light source 43 is turned ON, so that light emitted from the second light source 43 is incident on the lateral surface 44a of the second light guide plate 44. Therefore, as described later, a light deflection direction from the liquid crystal panel 15 can be controlled. It should be noted in the present embodiment that a light polarization direction from the first light source 41 is the second polarization direction, and a light polarization direction from the second light source 43 is the first polarization direction.

FIG. 12A is a cross-sectional view of the liquid crystal display device 1F in the first lighting state. As shown in FIG. 12A, when the head of the viewer 50 is positioned closer to one side (the right side in FIG. 12A) than the center of the liquid crystal panel 15, the control unit 17F switches the lighting state to the above-described first lighting state. Thereby, the light emitted from the first light source 41 is first incident on the lateral surface 42a of the first light guide plate 42, and then travels from the principal surface 42c of the first light guide plate 42 to the first traveling direction. The light traveling from the principal surface 42c of the first light guide plate 42 is deflected by the optical deflector 31 to a left-right direction at a high speed, and then incident on the liquid crystal panel 15. The light traveling from the liquid crystal panel 15, which is deflected towards the position of the head of the viewer 50, is incident alternately on the right eye 51a and the left eye 51b of the viewer 50.

Figure 12B:
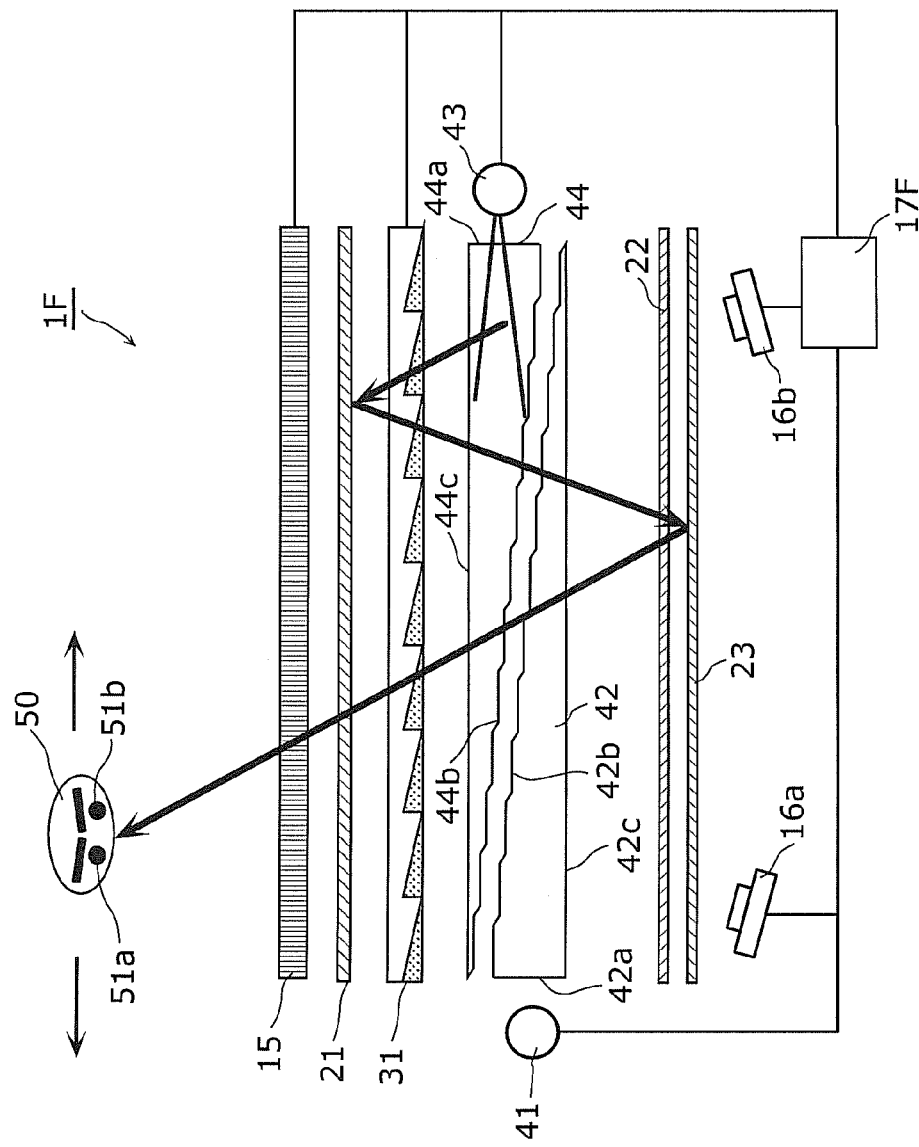
FIG. 12B is a cross-sectional view of a liquid crystal display device in a second lighting state.

FIG. 12B is a cross-sectional view of the liquid crystal display device 1F in the second lighting state. As shown in FIG. 12B, when the head of the viewer 50 is positioned closer to the other side (the left side in FIG. 12B) than the center of the liquid crystal panel 15, the control unit 17F switches the lighting state to the above-described second lighting state. Thereby, the light emitted from the second light source 43 is first incident on the lateral surface 44a of the second light guide plate 44, and then travels from the principal surface 44c of the second light guide plate 44 to the second traveling direction. The light traveling from the principal surface 44c of the second light guide plate 44 is deflected by the optical deflector 31 to a left-right direction at a high speed, and then incident on the liquid crystal panel 15. The light traveling from the liquid crystal panel 15, which is deflected towards the position of the head of the viewer 50, is incident alternately on the right eye 51a and the left eye 51b of the viewer 50.

As described above, by switching between the first lighting state and the second lighting state based on the position of the head of the viewer 50, it is possible to deflect the light traveling from the liquid crystal panel 15 to be adjusted according to the move of the head of the viewer 50. As a result, it is possible to set the light deflection angle required for the optical deflector 31 to be small.

For example, when a visual distance between the viewer 50 and the liquid crystal panel 15 is 300 mm and a range in which the head of the viewer 50 can move is 166 mm, a light deflection angle required for the optical deflector 31 in the case where the light is incident perpendicular to the optical deflector 31 is 31 degrees. However, as described in the present embodiment, if the light traveling from the first light guide plate 42 is incident on the optical deflector 31 at an angle of 7.7 degrees (in FIGS. 12A and 12B, an inclination angle towards the right with respect to the vertical direction on the sheets is assumed to be positive) and the light traveling from the second light guide plate 44 is incident on the optical deflector 31 at an angle of −7.7 degrees, the light deflection angle required for the optical deflector 31 is decreased to approximately 15.5 degrees. As the light deflection angle required for the optical deflector 31 is smaller, each of the crystals in the optical deflector 31 is wider. Therefore, it is possible to suppress the influence of light spreading resulting from diffraction, and also to suppress occurrence of crosstalk. In addition, a height of each of the crystals in the optical deflector 31 can be decreased. As a result, it is possible to increase the light deflection speed of the optical deflector 31.

It should be noted that the first light guide plate 42 and the second light guide plate 44 can be provided so that the planar parts 421 of the first light guide plate 42 are in contact to each other and the planar parts 421 of the second light guide plate 44 are in contact to each other. Therefore, it is possible to prevent light passing through the first light guide plate 42 and the second light guide plate 44 from being refracted and reflected at each of the inclined parts 422 of the first light guide plate 42 and the second light guide plate 44. As a result, the image quality of images displayed on the liquid crystal panel 15 can be improved.

It should be noted that it has been described in the present embodiment that the two light sources, namely, the first light source 41 and the second light source 43, are used. However, it is also possible that light emitted from the same light source is dispersed to the first light guide plate 42 and the second light guide plate 44. In this case, for example, a light source, a Polarization Beam Splitter (PBS), and a reflective plate can be used. The light source is capable of switching a light deflection direction from the light source between the first polarization direction and the second polarization direction, under the control of a polarization control unit. The PBS is a polarization reflection unit having a function of transmitting light traveling in the first polarization direction and reflecting light traveling from the second polarization direction. The above-described polarization control unit, the polarization reflection unit, and the reflective plate form a light guide plate selection unit. When the light polarization direction from the light source is the second polarization direction, the light emitted from the light source is reflected by the PBS. The light reflected by the PBS is incident on the first light guide plate 42, for example. When the light polarization direction from the light source is the first polarization direction, the light emitted from the light source passes through the PBS and then is reflected by the reflective plate. The light reflected by the reflective plate is incident on the second light guide plate 44, for example. As described above, by switching the light polarization direction from the light source between the first polarization direction and the second polarization direction, it is possible to switch a path of the light emitted from the light source in order to be selectively incident on one of the first light guide plate 42 and the second light guide plate 44.

It should be noted that one example of the methods for switching the light polarization direction from the light source is that a polarization plate (serving as the polarization control unit) through which only light traveling from a specific polarization direction can pass is provided between the light source and the PBS. By this method, when the polarization plate is rotated in a predetermined direction, it is possible to switch a light polarization direction of light passing through the polarization plate to another. It is also possible that a polarization rotation element made of crystal (serving as the polarization control unit) is provided between the light source and the PBS.

(Embodiment 8)

Figure 13:
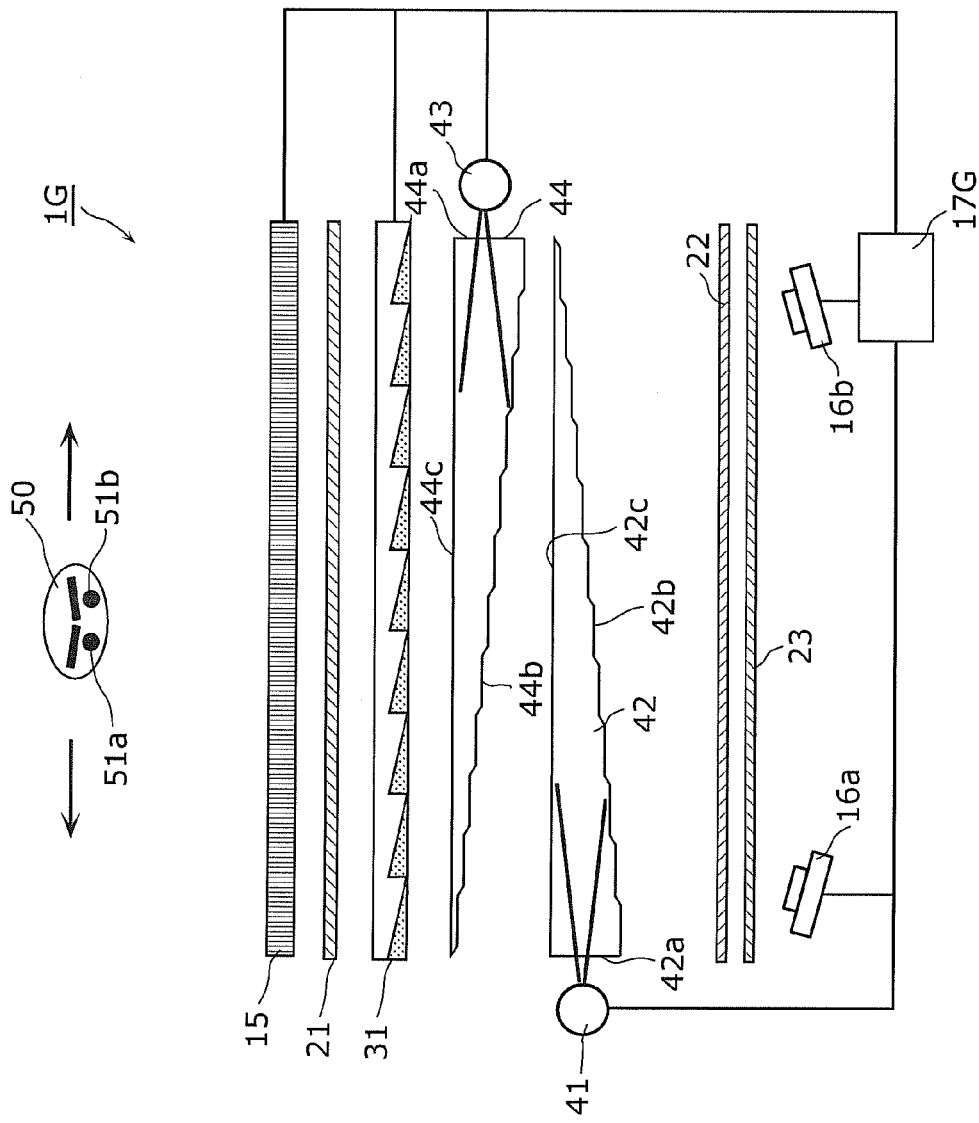
FIG. 13 is a cross-sectional view of a liquid crystal display device according to Embodiment 8.

FIG. 13 is a cross-sectional view of a liquid crystal display device 1G according to Embodiment 8. As shown in FIG. 13, in the present embodiment, the first light guide plate 42 and the second light guide plate 44 are arranged so that the uneven parts 42b and 44b face the reflective plate 23. The present embodiment can thereby produce the same effects as those of Embodiment 7.

In the present embodiment, it is possible to set the light polarization direction from the first light source 41 and the light polarization direction from the second light source 43 to be the same polarization direction (for example, the first deflection direction).

It should be noted in each of the above-described embodiments that each of the structural elements may be implemented as a dedicated hardware or implemented by executing a software program suitable for each of the structural elements. Each of the structural elements may be implemented when a program execution unit, such as a Central Processing Unit (CPU) or a processor, reads a software problem from a recording medium, such as a hard disk or a semiconductor memory, and executes the software program.

Although liquid crystal display devices according to one or more exemplary embodiments have been described in detail above, those skilled in the art will be readily appreciate that various modifications and combinations are possible in the exemplary embodiments without materially departing from the novel teachings and advantages of the present disclosure. Accordingly, all such modifications and combinations are intended to be included within the scope of the one or more embodiments.

INDUSTRIAL APPLICABILITY

The liquid crystal display device according to the present disclosure is capable of increasing a light deflection angle, suppressing deterioration of image quality of images displayed on a liquid crystal panel. In addition, the liquid crystal display device according to the present disclosure is capable of being used as, for example, a 3D display device, a privacy display device, and the like.

REFERENCE SIGNS LIST 1, 1A, 1B, 1C, 1D, 1E, 1F, 1G, 60 liquid crystal display device
11, 603 light source
12, 602 light guide plate
12a, 42a, 44a one lateral surface
12b, 42b, 44b uneven part
12c, 42c, 44c principal surface
13 first optical deflector
13a first optical deflection layer
13b second optical deflection layer
14 second optical deflector
15, 604 liquid crystal panel
16a, 16b, 605a, 605b stereo camera
17, 17C, 17D, 17F, 17G, 606 control unit
17a visual distance measurement unit
18 light emitting unit
19, 31, 601 optical deflector
21 polarizing reflective sheet
22 λ/4 sheet
23 reflective plate
41 first light source
42 first light guide plate
43 second light source
44 second light guide plate
50, 607 viewer
51a, 607a right eye
51b, 607b left eye
131a, 131b, 141, 601a liquid crystal deflection element
132a, 132b, 142, 611 liquid crystal
133a, 133b, 143, 612 dielectric
421 planar part
422 inclined part
613a, 613b, 613c electrode

The invention claimed is:
1. A liquid crystal display device, comprising:
a light emitting unit configured to emit light;
an optical deflector that deflects the light emitted by the light emitting unit;
a control unit configured to control a light deflection angle of the optical deflector; and
a liquid crystal panel that forms an image from the light traveling from the optical deflector,
wherein the optical deflector includes a first optical deflector and a second optical deflector which are arranged side by side in a direction from a light incident side to a light emitting side,
a maximum light deflection angle of the first optical deflector is smaller than a maximum light deflection angle of the second optical deflector, and a maximum light deflection speed of the first optical deflector is higher than a maximum light deflection speed of the second optical deflector,
each of the first optical deflector and the second optical deflector includes a plurality of liquid crystal deflection elements arranged in a planar state,
the control unit is configured to apply a voltage to each of the liquid crystal deflection elements to control a refractive index of the each of the liquid crystal deflection elements, thereby controlling a light deflection angle of the first optical deflector and a light deflection angle of the second optical deflector, and
the first optical deflector includes a plurality of optical deflection layers stacked in the direction from the light incident side to the light emitting side, each of the optical deflection layers including the liquid crystal deflection elements arranged in the planar state.

2. The liquid crystal display device according to claim 1, wherein the optical deflection layers include at least a first optical deflection layer and a second optical deflection layer, and
the control unit is configured to:
when a light deflection direction of the first optical deflector is to be controlled to be a first deflection direction, control respective refractive indexes of the liquid crystal deflection elements in the first optical deflection layer to prevent the first optical deflection layer from deflecting the light, and
when the light deflection direction of the first optical deflector is to be controlled to be a second deflection direction different from the first deflection direction, control respective refractive indexes of the liquid crystal deflection elements in the second optical deflection layer to prevent the second optical deflection layer from deflecting the light.

3. The liquid crystal display device according to claim 1, wherein the control unit has a visual distance measurement unit configured to measure a visual distance between a viewer viewing the liquid crystal panel and the liquid crystal panel, and
the control unit is configured to control an angle of a range in which the first optical deflector deflects the light to be equal to or larger than a larger one of a both-eye angle and a half angle, the both-eye angle being determined by a distance between both eyes of the viewer and the visual distance measured by the visual distance measurement unit, the half angle being a spread angle of light which is emitted from the liquid crystal panel and spreads due to diffraction until the light is incident on an eye of the viewer.

4. The liquid crystal display device according to claim 1, wherein the control unit is configured to change light deflection angles of at least two of the optical deflection layers, every time the first optical deflector deflects the light to a specific deflection direction.

5. The liquid crystal display device according to claim 1, wherein the liquid crystal deflection elements includes respective liquid crystals, and
each of respective heights of the liquid crystals in the first optical deflector in the direction from the light incident side to the light emitting side is lower than a height of a corresponding one of the liquid crystals in the second optical deflector in the direction from the light incident side to the light emitting side.

6. The liquid crystal display device according to claim 1, wherein the liquid crystal deflection elements includes respective liquid crystals, each of respective widths of the liquid crystals in the first optical deflector in a direction perpendicular to the direction from the light incident side to the light emitting side is smaller than a width of a corresponding one of the liquid crystals in the second optical deflector in the direction perpendicular to the direction from the light incident side to the light emitting side.

7. The liquid crystal display device according to claim 1, wherein the liquid crystal deflection elements include respective liquid crystals, and each of respective change widths of refractive indexes of the liquid crystals in the first optical deflector is smaller than a change width of a refractive index of a corresponding one of the liquid crystals in the second optical deflector.

8. The liquid crystal display device according to claim 1, further comprising a head position detection unit configured to detect a position of a head of a viewer viewing the liquid crystal panel, and wherein the control unit is configured to control a light deflection angle of the second optical deflector based on the position of the head of the viewer which is detected by the head position detection unit.

9. The liquid crystal display device according to claim 1, further comprising a both-eye position detection unit configured to detect positions of both eyes of a viewer viewing the liquid crystal panel, wherein the control unit is configured to control a light deflection angle of the first optical deflector based on the positions of the both eyes of the viewer which are detected by the both-eye position detection unit.

* * * * *

UNITED STATES PATENT AND TRADEMARK OFFICE
CERTIFICATE OF CORRECTION

PATENT NO. : 8,891,052 B2  
APPLICATION NO. : 13/820692  
DATED : November 18, 2014  
INVENTOR(S) : Sugiyama et al.

Page 1 of 1

It is certified that error appears in the above-identified patent and that said Letters Patent is hereby corrected as shown below:

On the Title Page:

Please insert the following:

--Related U.S. Application Data

(60) Provisional Application No. 61/510,541, filed on July 22, 2011.--

Signed and Sealed this
Twenty-fourth Day of May, 2016

Michelle K. Lee
*Director of the United States Patent and Trademark Office*